(12) United States Patent
Yamamoto

(10) Patent No.: US 7,773,821 B2
(45) Date of Patent: Aug. 10, 2010

(54) METHOD AND DEVICE FOR COMPRESSING AND EXPANDING IMAGE DATA

(75) Inventor: Toshitsugu Yamamoto, Takatsuki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 954 days.

(21) Appl. No.: 11/589,489

(22) Filed: Oct. 30, 2006

(65) Prior Publication Data

US 2007/0097450 A1   May 3, 2007

(30) Foreign Application Priority Data

Oct. 31, 2005   (JP)   ............................. 2005-315843
Oct. 3, 2006    (JP)   ............................. 2006-272304

(51) Int. Cl.
  *G06K 9/36* (2006.01)
  *H04N 1/41* (2006.01)
  *G06K 9/46* (2006.01)

(52) U.S. Cl. .................................. 382/243; 358/426.01

(58) Field of Classification Search ................ 382/162, 382/164, 165, 166, 173, 218–220, 232, 233, 382/239, 272; 358/1.16, 1.9, 3.13, 426.01, 358/426.11, 515, 521, 524, 530; 375/240.01, 375/240.25, E7.202, E7.206; 348/409.1
See application file for complete search history.

(56) References Cited

U.S. PATENT DOCUMENTS

| 4,365,273 A * | 12/1982 | Yamada et al. .............. 382/299 |
| 4,782,400 A * | 11/1988 | Ohtani ................... 358/426.11 |
| 5,046,119 A   | 9/1991  | Hoffert et al. .................. 382/56 |
| 5,289,292 A * | 2/1994  | Osada et al. ................. 358/451 |
| 5,528,377 A * | 6/1996  | Hutcheson .................. 358/1.9 |
| 5,638,464 A * | 6/1997  | Kawamura .................. 382/232 |
| 5,696,842 A * | 12/1997 | Shirasawa et al. ............ 382/176 |
| 5,861,962 A * | 1/1999  | Maeda ....................... 358/451 |
| 6,154,569 A * | 11/2000 | Sakaue et al. ............... 382/233 |
| 6,330,077 B1* | 12/2001 | Sato et al. ..................... 358/1.9 |
| 7,221,476 B2* | 5/2007  | Nishi et al. ................... 358/1.9 |
| 7,336,386 B2* | 2/2008  | Oteki et al. ................. 358/1.16 |
| 2007/0013953 A1* | 1/2007 | Yamamoto .................. 358/3.13 |
| 2007/0097450 A1* | 5/2007 | Yamamoto ................ 358/426.01 |
| 2007/0116367 A1* | 5/2007 | Yamamoto .................. 382/232 |

FOREIGN PATENT DOCUMENTS

| JP | 4-270473 | 9/1992 |
| JP | 6-152986 | 5/1994 |
| JP | 9-83809  | 3/1997 |

* cited by examiner

*Primary Examiner*—Amir Alavi
(74) *Attorney, Agent, or Firm*—Sidley Austin LLP

(57) ABSTRACT

A method for compressing image data having pixels arranged like a matrix in a line direction and a sub scan direction orthogonal to the line direction is provided herein. The disclosed method allows for a reduction in memory capacity necessary for the expansion of the data. The method includes the steps of dividing the image data in the line direction and in the sub scan direction into blocks covering a plurality of lines, determining a representative value about density of pixels included in each of the blocks, determining additional information for each line in each of the blocks or for a plurality of lines whose number is smaller than the total number of lines of the block and creating compressed data by using the representative value and the additional information.

15 Claims, 29 Drawing Sheets

20 PIXELS IN THE
HORIZONTAL DIRECTION

| A00-00 | A00-01 | ... | A00-18 | A00-19 |
|--------|--------|-----|--------|--------|
| A01-00 | A01-01 | ... | A01-18 | A01-19 |
| ⋮ | ⋮ | ⋮ | ⋮ | ⋮ |
| A18-00 | A18-01 | ... | A18-18 | A18-19 |
| A19-00 | A19-01 | ... | A19-18 | A19-19 |

20 PIXELS IN THE VERTICAL DIRECTION

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| A00-00 | 123 | 126 | 129 | 132 | 135 | 138 | 141 | 144 | 147 | 150 | 153 | 156 | 159 | 162 | 165 |
| A00-01 | 243 | 246 | 249 | 252 | 255 | 255 | 255 | 255 | 255 | 255 | 255 | 255 | 255 | 255 | 255 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| A01-00 | 101 | 104 | 107 | 110 | 113 | 116 | 119 | 122 | 125 | 128 | 131 | 134 | 137 | 140 | 143 |
| A01-01 | 3 | 6 | 9 | 12 | 15 | 18 | 21 | 24 | 27 | 30 | 33 | 36 | 39 | 42 | 45 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

| TL1 | TL2 | TL3 | TL4 | TL5 |
|---|---|---|---|---|
| 108, 108, 108 | 108, 108, 108 | 112, 115, 116 | 115,  0,  0 | 2,  0,  0 |
| <0> | <0> | <0> | <0> | <1> |
| <0> | <0> | <1> | <1> | <0> |
| <000> | <000> | <111> | <101> | <000> |
| <0> | <0> | <0> | <0> | <0> |

FIG. 19A
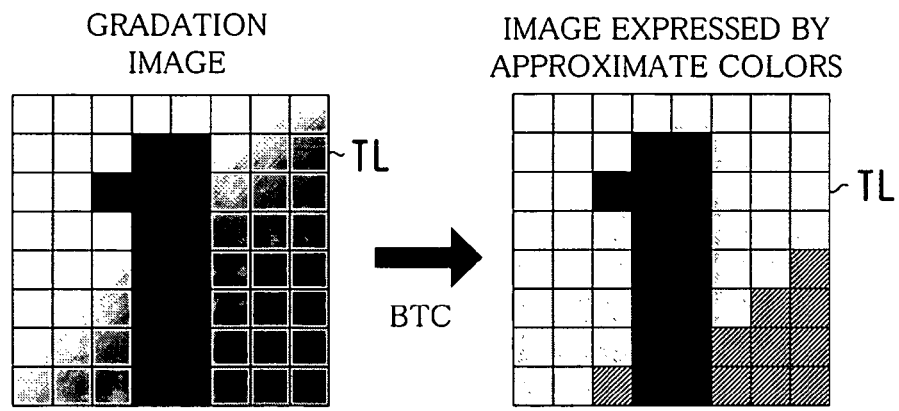
FIG. 19B
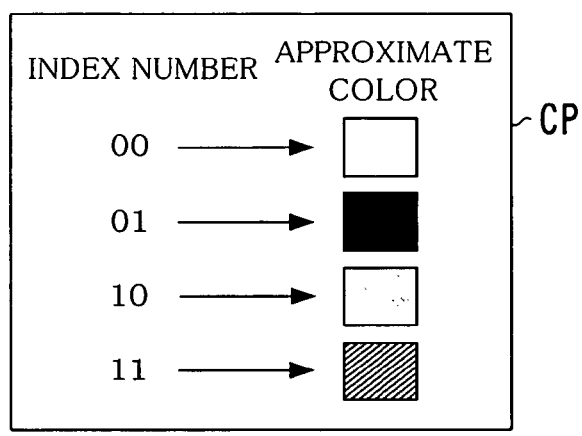
FIG. 19C
| 00 | 00 | 00 | 00 | 10 | 10 | 10 | 10 |
|---|---|---|---|---|---|---|---|
| 00 | 00 | 00 | 01 | 01 | 10 | 10 | 10 |
| 00 | 00 | 01 | 01 | 01 | 10 | 10 | 10 |
| 00 | 10 | 10 | 01 | 01 | 10 | 10 | 10 |
| 10 | 10 | 10 | 01 | 01 | 10 | 10 | 11 |
| 10 | 10 | 10 | 01 | 01 | 10 | 11 | 11 |
| 10 | 10 | 10 | 01 | 01 | 11 | 11 | 11 |
| 10 | 10 | 10 | 01 | 01 | 11 | 11 | 11 |
TL

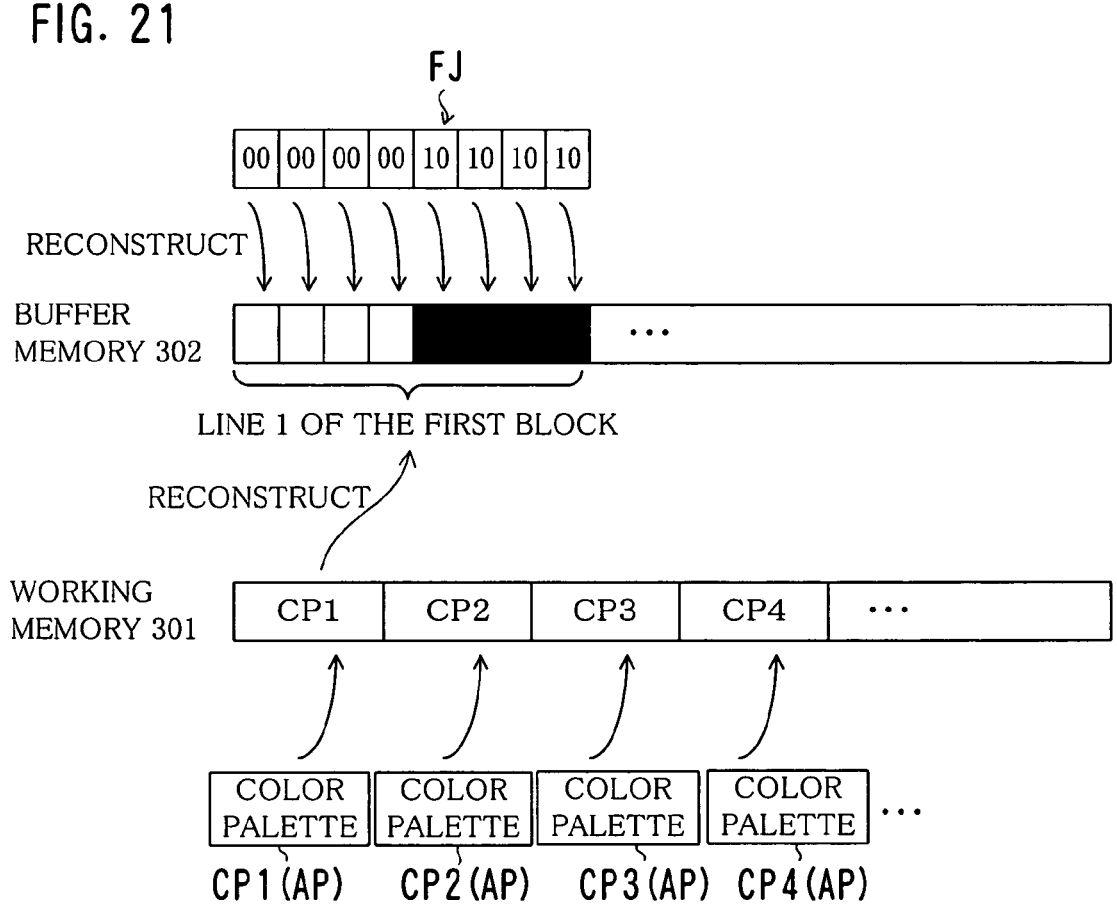

| 32 | 34 | 36 | 38 | 40 | 42 | 44 | 46 |
|----|----|----|----|----|----|----|----|
| 36 | 38 | 40 | 42 | 44 | 46 | 48 | 50 |
| 40 | 42 | 44 | 46 | 48 | 50 | 52 | 54 |
| 44 | 46 | 48 | 50 | 52 | 54 | 56 | 58 |
| 48 | 50 | 52 | 54 | 56 | 58 | 60 | 62 |
| 52 | 54 | 56 | 58 | 60 | 62 | 64 | 66 |
| 56 | 58 | 60 | 62 | 64 | 66 | 68 | 70 |
| 60 | 62 | 64 | 66 | 68 | 70 | 72 | 74 |

TL

AVERAGE VALUE IN BLOCKS

→ 53  AP

| -21 | -19 | -17 | -15 | -13 | -11 | -9  | -7  |
|-----|-----|-----|-----|-----|-----|-----|-----|
| -17 | -15 | -13 | -11 | -9  | -7  | -5  | -3  |
| -13 | -11 | -9  | -7  | -5  | -3  | -1  | 1   |
| -9  | -7  | -5  | -3  | -1  | 1   | 3   | 5   |
| -5  | -3  | -1  | 1   | 3   | 5   | 7   | 9   |
| -1  | 1   | 3   | 5   | 7   | 9   | 11  | 13  |
| 3   | 5   | 7   | 9   | 11  | 13  | 15  | 17  |
| 7   | 9   | 11  | 13  | 15  | 17  | 19  | 21  |

LINE1  -21,-19,-17,-15,-13,-11,-9,-7    FJ
LINE2  -17,-15,-13,-11,-9,-7,-5,-3      FJ
LINE3  -13,-11,-9,-7,-5,-3,-1,1         FJ

⋮

METHOD AND DEVICE FOR COMPRESSING AND EXPANDING IMAGE DATA

This application is based on Japanese patent application Nos. 2005-315843 filed on Oct. 31, 2005 and 2006-272304 filed on Oct. 3, 2006, the contents of which are hereby incorporated by reference.

BACKGROUND OF THE INVENTION

1. Field of the Invention

The present invention relates to a method and a device for compressing and expanding image data as well as a printer.

2. Description of the Prior Art

In general, a print system including a computer and a printer is used. As such a print system, there is a type in which a computer side performs image processing such as a pseudo gradation process on image data to be printed so that a printer side does not need to perform a special process on the image data received from the computer and prints the image on a paper sheet just by using the image data.

In addition, the computer side performs data compression so as to reduce quantity of image data transmitted from the computer to the printer. There are proposed various compression methods including a method of compressing image data by a pseudo gradation process (see Japanese unexamined patent publication No. 6-152986).

Usually, in order to compress and expand image data efficiently, it is preferable to utilize a two-dimensional relationship of the image. Therefore, an image (image data) is divided into a plurality of blocks in a line direction that is a main scan direction and in a sub scan direction that is orthogonal to the line direction. Then, densities of all pixels within each of the blocks are represented by one representative value. In this case, there are proposed various compression methods in which additional information is added for a part that cannot be expressed only by the representative value, so that the representative value and the additional information are used by the block for expressing the image.

The image data (compressed data) that are compressed by the conventional method for each block will be expanded for each block, i.e., by the block.

However, in order to print or display the expanded image, the image data must be retrieved for each line. The above-mentioned conventional compression method and expansion method need two-sets of memories having the same size of line numbers as the size in the sub scan direction of the block, and therefore there is a problem that a large number of memory capacity is required for performing the expansion process.

More specifically, since the conventional compressed data include the representative values and the additional information generated by the block, the expansion process must be also performed by the block. Therefore, a working memory for expansion is necessary for lines whose number is the same as the number of lines in a block, and an output buffer memory for transferring the expanded image data is necessary for lines whose number is the same as those of the working memory.

For example, if the block includes four lines, memories for eight lines are necessary, which include working memories for four lines and output buffer memories for four lines, as shown in FIG. 29. In FIG. 29, image data of each block are expanded sequentially based on the representative value and the additional information, and they are written from the head of the working memory. When the image data are expanded in the entire area of the working memory, they are transferred to the output buffer memory, and the next leading block is expanded and written in the working memory followed by other blocks sequentially. The transferred image data are read out from the output buffer memory by the line sequentially, and light emission intensity of a laser diode is controlled in accordance with the read data. Then, in an electrophotographic print engine, an image is formed when a surface of a photoconductor drum or the like is scanned by a laser beam with intensity modulation.

As described above, a large memory capacity is necessary for the expansion process in the conventional method. Therefore, when a circuit for the expansion process is made of an ASIC and incorporated in equipment, the ASIC cannot be realized easily. Further, if the memories are disposed outside the ASIC, connection pins are necessary between the memories and the ASIC, which causes a disadvantage in cost as well as a difficulty of high speed access to the memories resulting in a difficulty of high speed process of the entire system.

SUMMARY OF THE INVENTION

An object of the present invention is to provide a method and a device for compressing and expanding image data, which can reduce a memory capacity necessary for the expansion process, so as to enable necessary memories to be embedded in an ASIC or the like for a high speed expansion of the image at a low cost.

A compression method according to one aspect of the present invention is a method for compressing image data having pixels arranged like a matrix in a line direction and a sub scan direction that is orthogonal to the line direction. The method includes the steps of dividing the image data in the line direction and in the sub scan direction into a plurality of blocks covering a plurality of lines, determining a representative value about density of pixels included in each of the blocks, determining additional information for each one line in each of the blocks or for each plurality of lines whose number is smaller than the number of lines of the block in each of the blocks, the additional information being information about the density of each of the pixels to be used instead of the representative value or to be added to the representative value, if there is, and creating compressed data by using the representative value and the additional information.

Preferably, the representative value may be an average value of density of pixels in the block, and the additional information may be a difference between a density value of a pixel on each of the lines in the block and the average value.

Alternatively, the representative value may be a parameter for expressing the image data in the block by using a function, and the additional information may be a difference between a density value of a pixel on each of the lines in the block and the image data expressed by the function.

Alternatively, the image data may be obtained by a pseudo gradation process using a dither pattern, and the representative value may be selected from a specific density value such that a pseudo gradation image obtained by the pseudo gradation process on the specific density value using the dither pattern that was used for the pseudo gradation process matches the image data in the block.

In addition, the additional information may be the image data on each of the lines. Alternatively, it may be a difference between a density value of a pixel on each of the lines in the block and the representative value.

In addition, it may be decided whether or not the image data are reproduced appropriately based on the representative value, and the additional information may be determined as information to be added if it is decided that the image data are not reproduced appropriately.

In addition, the compressed data may be created by using a difference between representative values of neighboring blocks.

In addition, the representative value may be a palette data indicating a plurality of gradation steps for expressing pixels in the block by reducing the number of gradation steps of the image data, and the additional information may be information indicating which of the gradation steps indicated in the palette data each of the pixels included in a line concerning the additional information in the block corresponds to.

Further, the representative value may be a palette data indicating a plurality of colors for expressing pixels in the block by reducing the number of colors of the image data, and the additional information may be information indicating which of the colors indicated in the palette data each of the pixels included in a line concerning the additional information in the block corresponds to.

In addition, lines in the same number as those in one block are set as a band, and in each band, the representative value in each of the blocks may be outputted, and then the additional information of each of the lines may be outputted, so that the compressed data are generated.

In addition, lines in the same number as those in one block are set as a band, and in each band, a representative value of each of the blocks and additional information of a first line in the band may be outputted, and then additional information of the second line and subsequent lines may be outputted, so that the compressed data may be generated.

A data compression device according to one aspect of the present invention includes a dividing portion for dividing the image data in the line direction and in the sub scan direction into a plurality of blocks covering a plurality of line, a determining portion for determining a representative value about density of pixels included in each of the blocks, a determining portion for determining additional information for each one line in each of the blocks or for each plurality of lines whose number is smaller than the number of lines of the block in each of the blocks, the additional information being information about the density of each of the pixels to be used instead of the representative value or to be added to the representative value, and a creating portion for creating compressed data by using the representative value and the additional information.

Preferably, the device further may include an output portion for outputting a representative value in each of the blocks and then outputting additional information of each of the lines, in each band that includes lines in the same number as those in one block.

Alternatively, the device may include an output portion for outputting a representative value in each of the blocks together with additional information of a first line in the band and then outputting additional information of a second line and subsequent lines, in each band that includes lines in the same number as those in one block.

An expansion method according to one aspect of the present invention is a method for expanding compressed data that are created from image data having pixels arranged like a matrix in a line direction and in a sub scan direction that is orthogonal to the line direction by using a representative value about density of pixels included in each of blocks obtained by dividing the image data and additional information about density determined for one or more lines in each of the blocks. The method includes a first step for receiving the representative values for blocks for one band consisting of blocks arranged along the line direction, a second step for receiving the additional information of one or more lines included in the blocks for the one band, a third step for reconstructing image data of one or more lines concerning the additional information in the one band based on the representative values and the additional information received in the first and the second steps, and for recording the image data in a line memory, a fourth step for reading the image data recorded in the line memory so as to output the same, and a fifth step for repeating the second through the fourth steps for all the lines included in the one band.

Thus, the compression process is performed by one block while the expansion process can be performed by one line or plural line that are fewer than lines included in the block.

According to the present invention, memory capacity necessary for the expansion process can be reduced, thereby the memory can be embedded in an ASIC or the like so that the image expansion can be performed at high speed and low cost.

BRIEF DESCRIPTION OF THE DRAWINGS

FIG. 12 is a diagram showing an example of pseudo gradation image data.

FIGS. 13A and 13B are diagrams showing an example of a dither pattern.

FIG. 16 is a diagram showing an example of contents of a working memory.

FIGS. 19A-19C are diagrams for explaining a BTC method.

FIG. 21 is a diagram for explaining the expansion to the buffer memory.

DESCRIPTION OF THE PREFERRED EMBODIMENTS

The invention will now be described in detail with reference to the attached drawings.

[General Structure of a Whole System]

Figure 1:
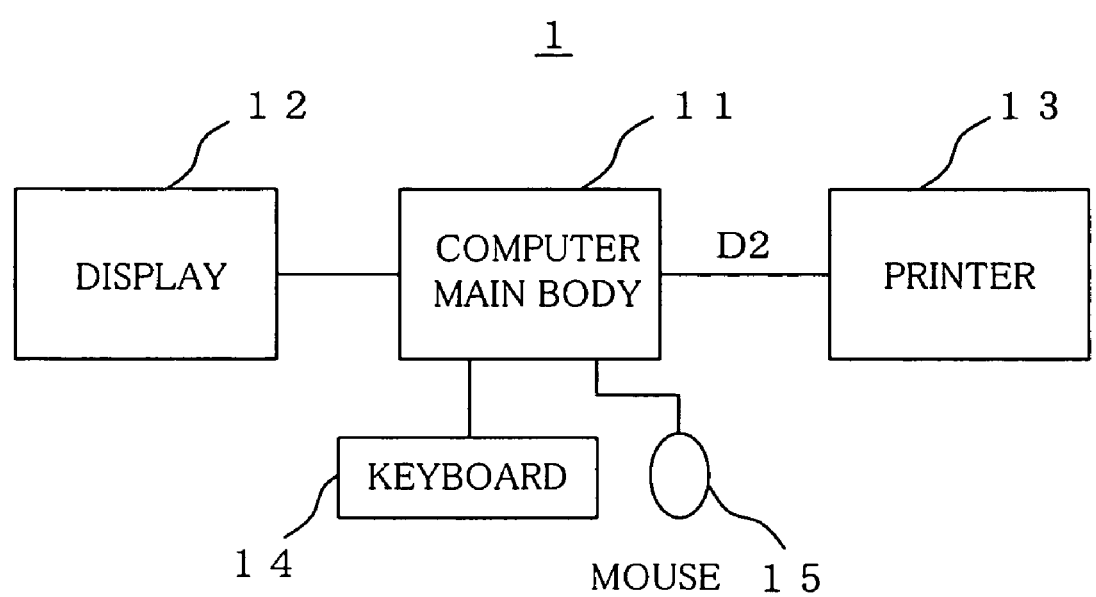
FIG. 1 shows a general structure of a print system according to an embodiment of the present invention.
Figure 2:
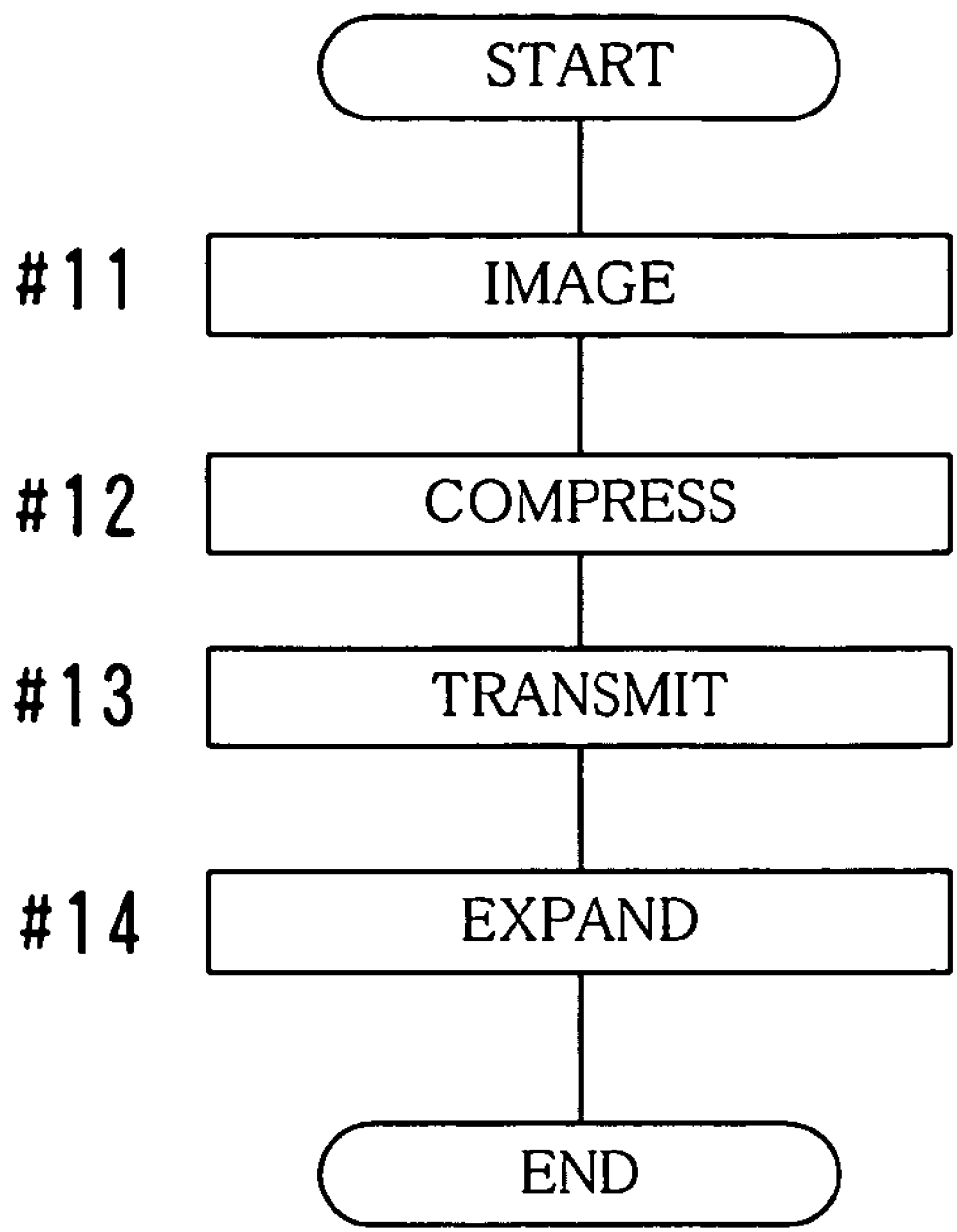
FIG. 2 is a flowchart showing a flow of image data in the print system.
Figure 3:
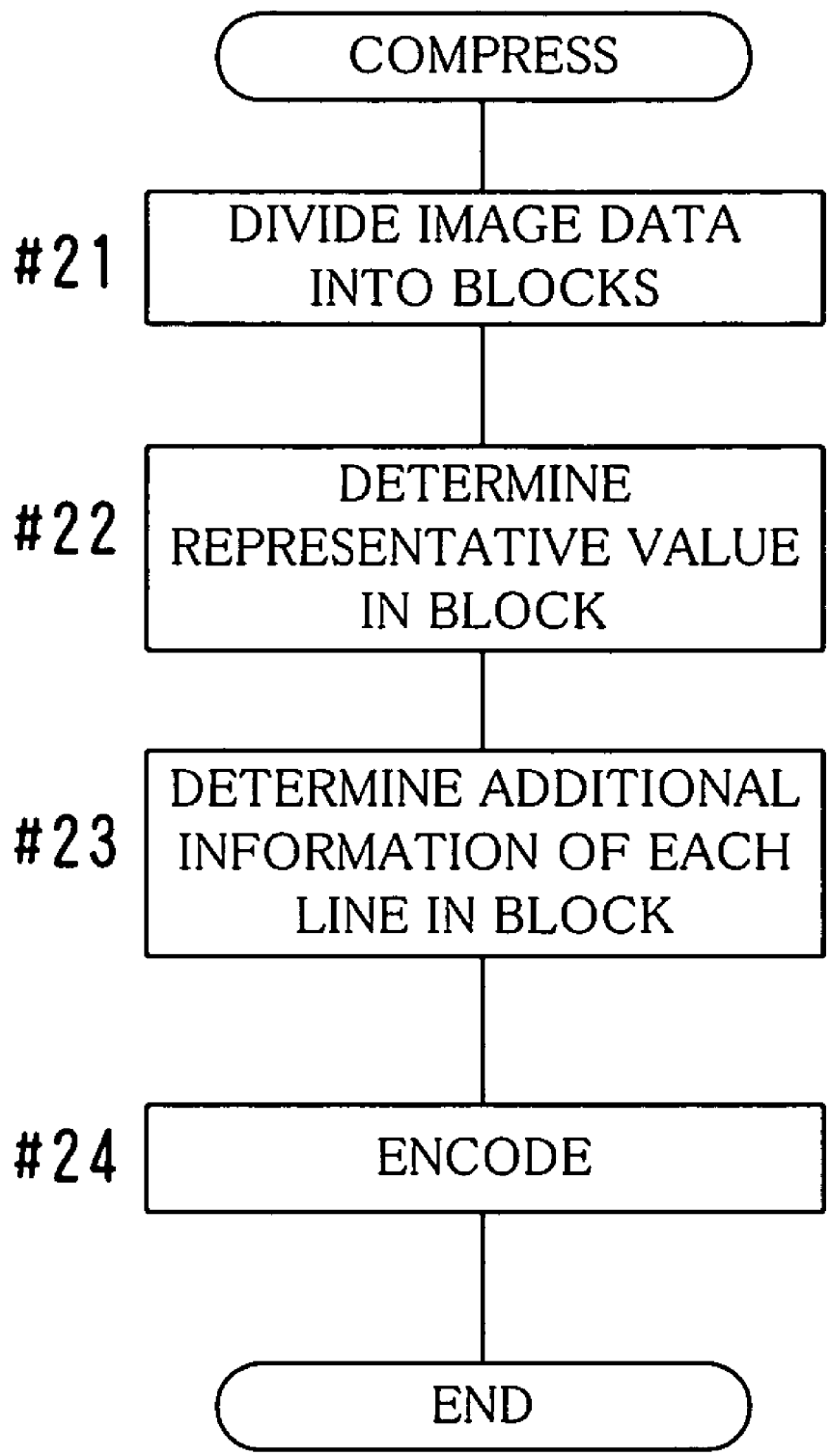
FIG. 3 is a flowchart showing a general flow of a compression process.
Figure 4:
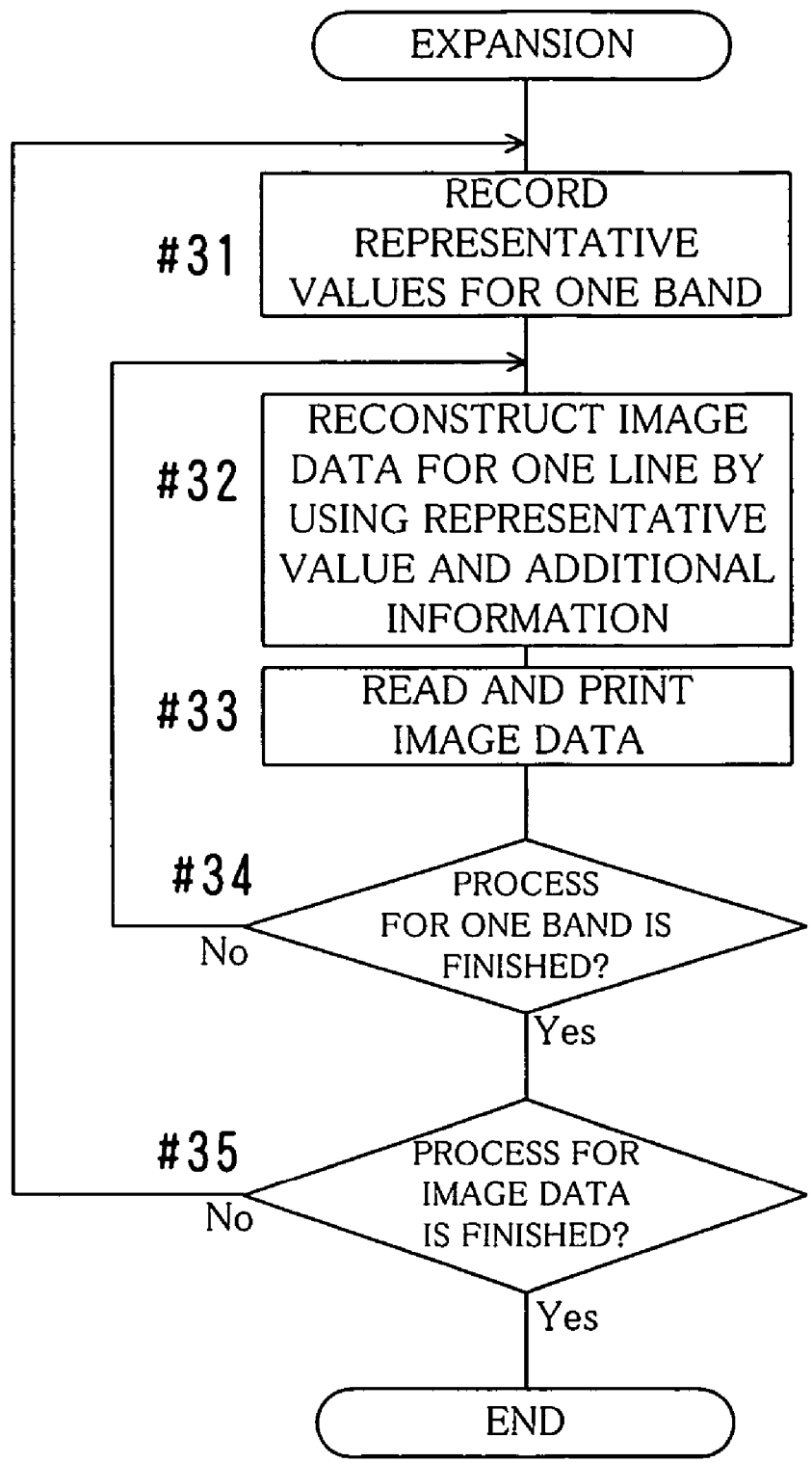
FIG. 4 is a flowchart showing a general flow of an expansion process.

FIG. 1 shows a general structure of a print system 1 to which an image data compression method according to an embodiment of the present invention is applied, FIG. 2 is a flowchart showing a flow of image data in the print system 1, FIG. 3 is a flowchart showing a general flow of a compression process, and FIG. 4 is a flowchart showing a general flow of an expansion process.

Note that in the following description "image data", "gradation image data", "pseudo gradation image data" and the like may be referred to as an "image", a "gradation image", a "pseudo gradation image" and the like simply by omitting "data".

In FIG. 1, the print system 1 includes a computer main body 11, a display 12, a printer 13, a keyboard 14 and a mouse 15.

The computer main body 11 compresses image data given externally or created inside itself, and sends the compressed data to the printer 13. In this example, the image data FD are gradation image data having 256 gradation steps for each color of CMYK, for example. The image data FD may be data expressed by RGB, or binary or multivalued pseudo gradation image data.

The printer 13 is a laser printer equipped with an electrophotographic print engine in this embodiment. In the printer 13, a laser beam emitted by a laser diode is deflected by a polygon mirror or the like, and the laser beam scans a surface of a photoconductor drum or the like so as to form an electrostatic latent image. The laser beam from the laser diode is intensity modulated. The intensity modulation is performed by using reconstructed image data. More specifically, image data obtained by reconstructing the compressed data are read out of the buffer memory, in which the image data are recorded, in the order of pixels in synchronization with the scanning of the photoconductor drum by the laser beam. The read image data are outputted as intensity data to a laser drive portion that is a driving circuit of the laser diode.

As shown in FIG. 2, in the computer main body 11, the target image data FD (#11) are compressed to create compressed data (#12), and the compressed data are transmitted to the printer 13 (#13). In the printer 13, the compressed data are expanded to print on a paper sheet or the like (#14).

In the compression process of the step #12, the image data FD are divided into blocks first as shown in FIG. 3 (#21). More specifically, the image data FD are divided into blocks in the line direction that is a main scan direction and in a sub scan direction, so that many blocks arranged in a matrix are defined. Each of the blocks has a size over a plurality of lines in the sub scan direction. When the image data FD are divided into blocks, it is not always necessary to divide the whole image data FD in advance. For example, it is possible to cut out image data of a block to be processed at the time.

Then, a representative value about density in each block is determined (#22). This "representative value" is a parameter representing density values of pixels in each of the blocks (an area parameter). Using the representative value, density values of pixels in the block can be reproduced with substantial accuracy.

As to the representative value, if there is a true representative value that can express density values of pixels in the block only by itself in substantial accuracy, the true representative value can be used. However, there is a case where such a true representative value does not exist. In this case, a parameter indicating that a true representative value does not exist is included in an extended representative value, which can be used as the representative value. In this specification, the "true representative value" and the "extended representative value" may be referred to as the "representative value" without discriminating between them.

Then, additional information is determined for each line of the block if necessary (#23). This "additional information" is information about densities of pixels of each line in each block, and it is information to be replaced with the representative value or to be added to the representative value. Therefore, the additional information is determined for each line in the block. In this embodiment, since the block has a size corresponding to four lines, there are sets of additional information for four lines at most. Note that a size of each block is not limited to this.

More specifically, one representative value is used for reproducing an image of the whole block, i.e., for reproducing an image of every line in the block, and one piece of additional information is used for reproducing an image of one line in the block. In other words, the representative value is a parameter that is used repeatedly for reproducing images of lines in the block, while the additional information is a parameter that is used only once for reproducing an image of detail, i.e., an image of one line in the block. In this embodiment, a parameter that is used repeatedly for reproducing images and a parameter that is used only once are generated separately and are encoded individually in the compression process. This is a feature of this embodiment.

If the representative value is not the true representative value, sets of the additional information are generated usually in the same number as the number of lines in the block. In this case, the representative value (the extended representative value) indicates that the additional information exists. At last, one representative value is generated for each block, and sets of the additional information are generated in the same number as the number of lines at most. In addition, if the representative value is not determined in the block, the block may be further divided into a plurality of small blocks. In this case, a representative value is determined for each small block, and additional information is determined for each line in the small block.

Although the additional information is determined for each line in the block according to the above description, it is possible to determine the additional information not for each line but for each set of a plurality of lines. For example, if the printer 13 has a structure in which a plurality of laser diodes is arranged in parallel so as to output laser beams for a plurality of lines simultaneously, the additional information may be determined for each set of the plurality of lines corresponding to the plurality of laser diodes.

Then, the representative value and the additional information are encoded so as to generate compressed data (#24). As an encoding method, Huffman method can be used, for example.

Next, the expansion process in the step #14 will be described. A working memory and a buffer memory are used for the expansion process. The working memory stores the representative values for blocks of one line (one band) arranged along the line direction. The buffer memory stores the reconstructed image data for one line. Therefore, the image data are reconstructed on this buffer memory. Note that the representative value and the additional information encoded in the compression process described above are decoded in advance.

As shown in FIG. 4, the representative values for the blocks of one band are recorded on the working memory first (#31). Note that the "band" means a group of lines in the same number as one block. In other words, an area of one band is the same as a whole area of a plurality of blocks that are arranged on the line direction. Therefore, the blocks of one band are the same as the blocks of one line in the main scan direction (see FIG. 8).

Then, for one line, the image data reconstructed by the representative value are recorded (written) in the position corresponding to each block of the buffer memory, and as to the block having the additional information the image data reconstructed by the additional information are recorded in the position corresponding to the block of the buffer memory (#32).

Then, the image data reconstructed and recorded (written) on the buffer memory are read out of the buffer memory from the head and are outputted (#33). The outputted image data are used for controlling light emission intensity of the laser diode. Since reading out of the buffer memory can be performed right after writing the reconstructed image data, the reconstructed image data may be read out before the writing of one line is completed.

Then, the process of the steps #32-33 is repeated for every line included in the blocks of one band (#34). Repeating the steps #31-34, all the compressed data that were received are expanded and printed (#35).

Note that a personal computer, a workstation and other various computers can be used as the computer main body 11, and that a raster printer, a GDI printer and other various printers can be used as the printer 13.

[Compression Process and Expansion Process]

The compression process and the expansion process in this embodiment will be described more in details as follows.

Figure 5:
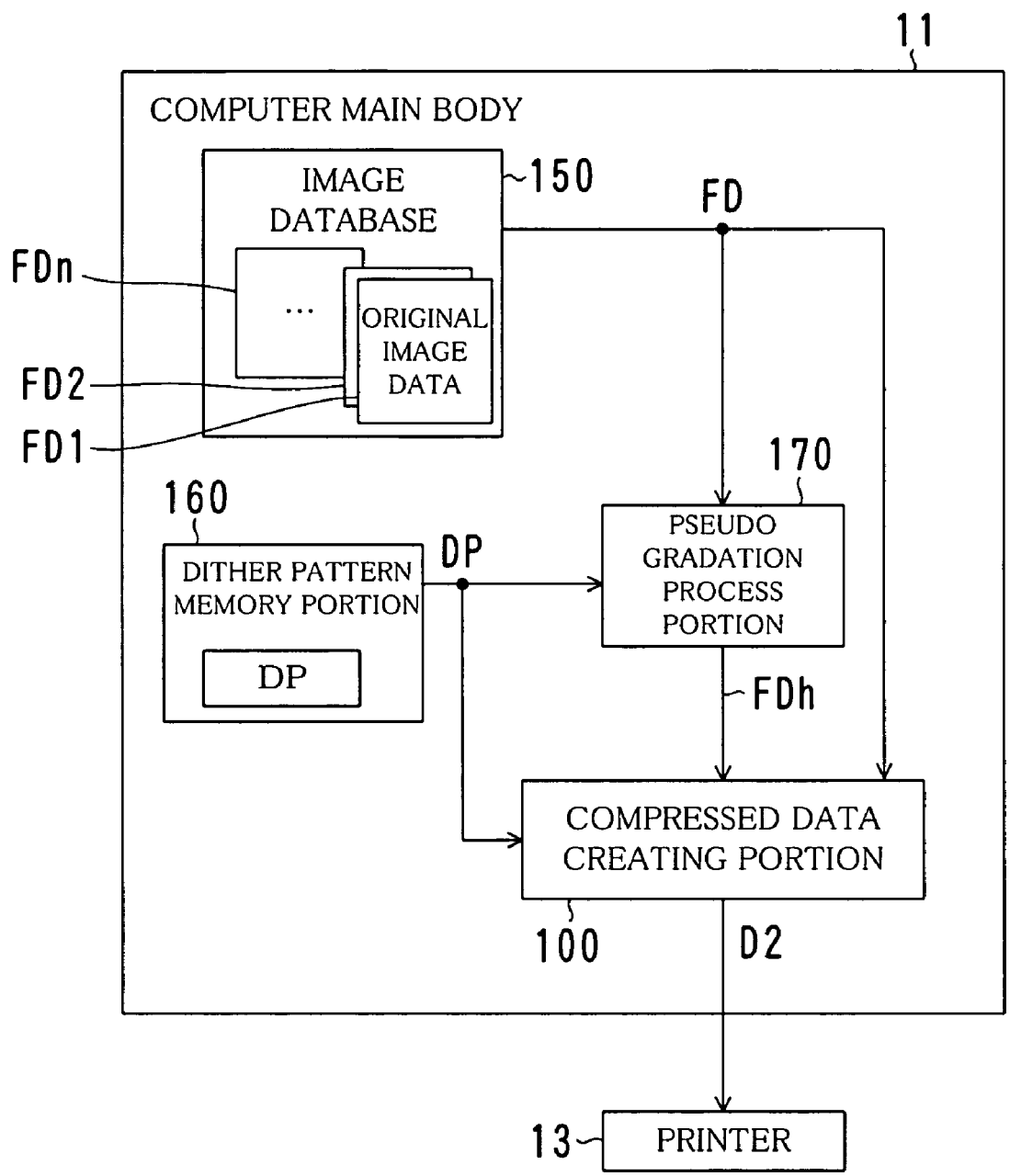
FIG. 5 is a block diagram showing a functional structure of a computer main body.
Figure 6:
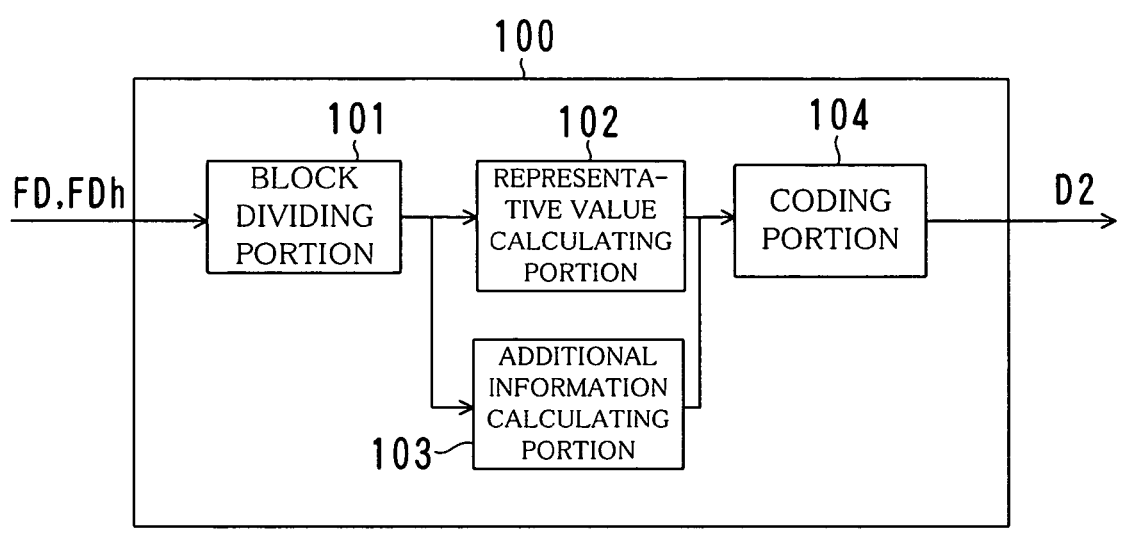
FIG. 6 is a block diagram showing an example of a functional structure of a compressed data creating portion.
Figure 7:
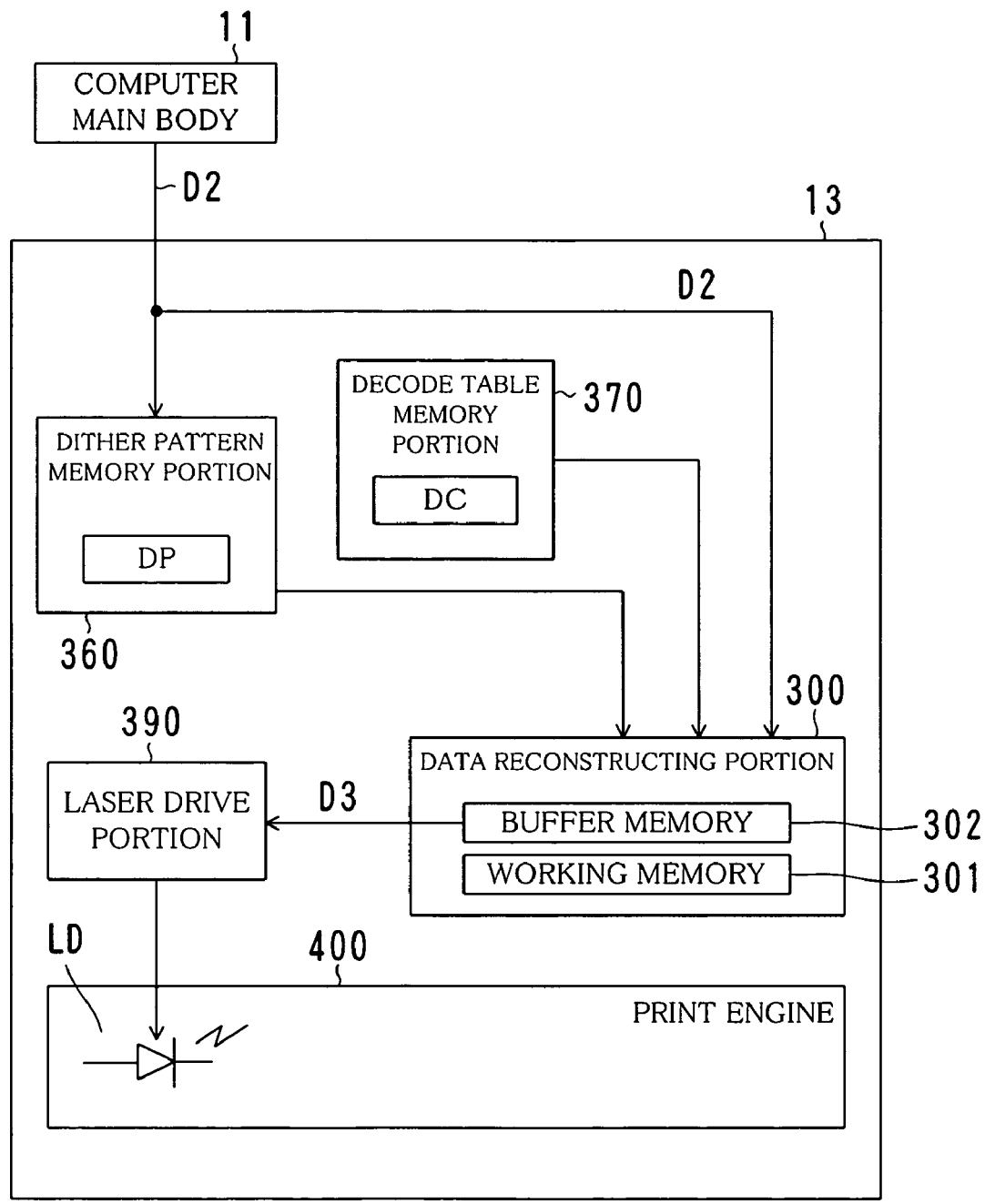
FIG. 7 is a block diagram showing a functional structure of a printer.
Figure 8:
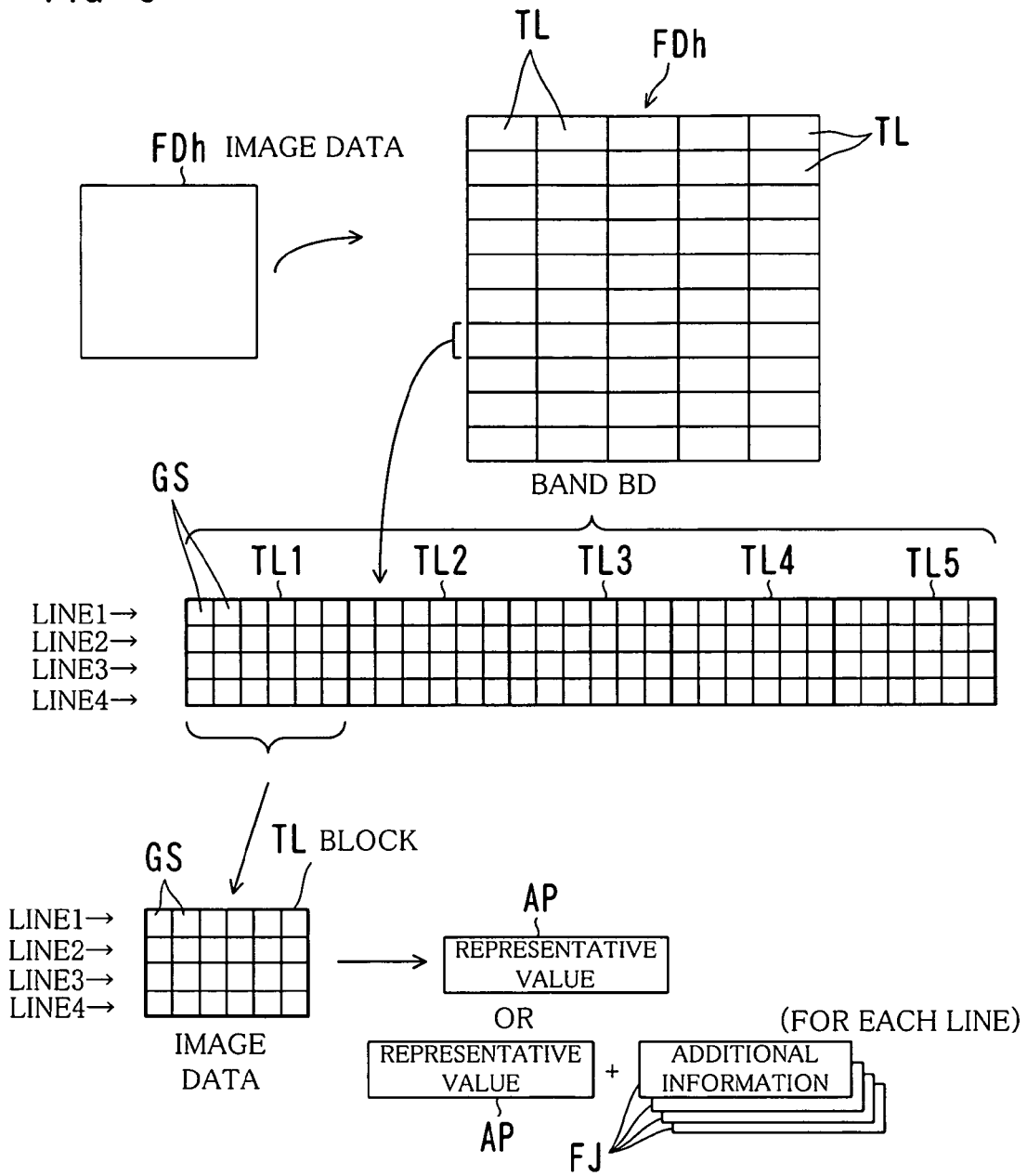
FIG. 8 is a diagram showing a relationship between a block and a representative value as well as additional information.
Figure 9:
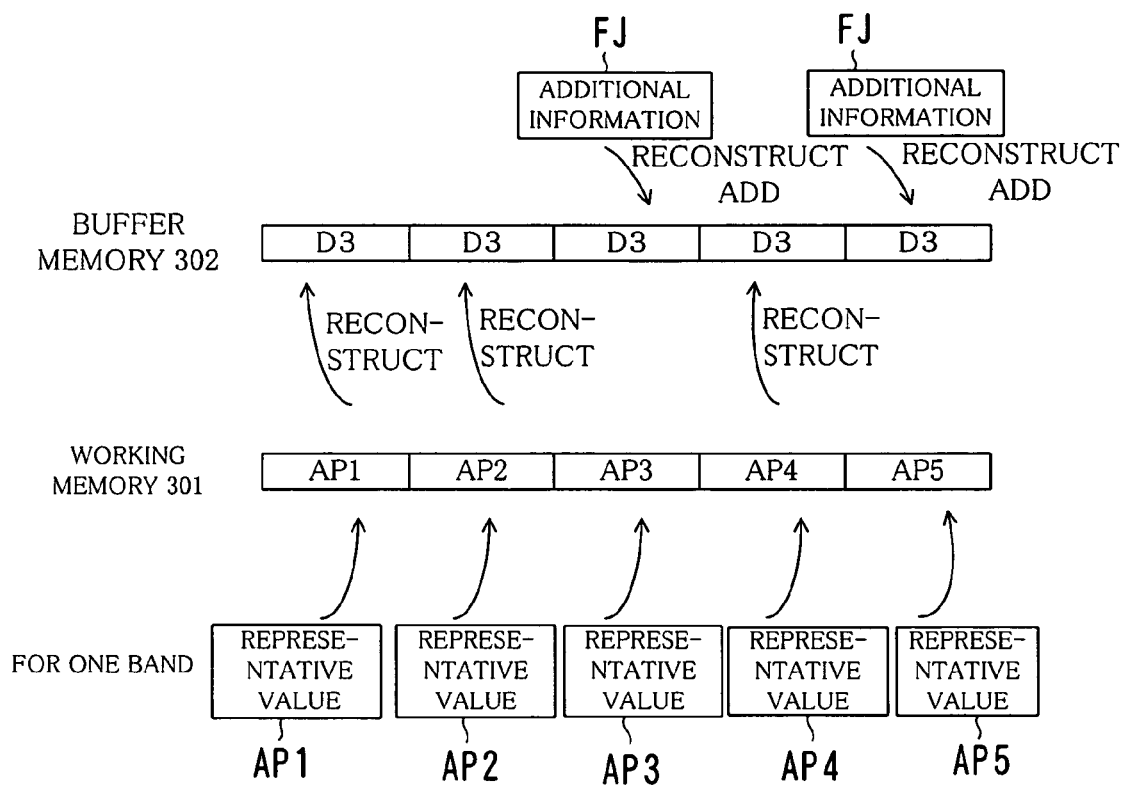
FIG. 9 is a diagram for explaining a process of an expansion to a buffer memory.

FIG. 5 is a block diagram showing a functional structure of the computer main body 11, FIG. 6 is a block diagram showing an example of a functional structure of a compressed data creating portion 100, FIG. 7 is a block diagram showing a functional structure of the printer 13, FIG. 8 is a diagram showing a relationship between a block and a representative value as well as additional information, and FIG. 9 is a diagram for explaining a process of an expansion to a buffer memory.

In FIG. 5, the computer main body 11 is made up of an image database 150, a dither pattern memory portion 160, a pseudo gradation process portion 170, and the compressed data creating portion 100.

The image database 150 keeps many image data FD1, FD2, ... FDn. The entire or a part of the image data FD1-FDn may be referred to as "image data FD". Most of the image data FD are a color image, and in this case, one piece of image data FD is made up of image data of 256 gradation steps for each of C (cyan), M (magenta), Y (yellow) and K (black) colors. The image data FD are inputted from a scanner, a digital camera or other external devices. Alternatively, they are obtained after editing or creation inside the computer main body 11.

The dither pattern memory portion 160 keeps a plurality of types of dither patterns DP. The dither patterns DP are prepared for each color of C, M, Y and K, and also for a character area, an image area, a chart area and the like.

The pseudo gradation process portion 170 converts the image data FD into pseudo gradation image data FDh having 16 gradation steps by using the dither pattern DP, if necessary. Although the pseudo gradation process of 16 gradation steps is performed in this embodiment, the process may be other multi-value process for converting an image into multi values such as two values or four values without limiting to the 16 gradation steps.

The compressed data creating portion 100 performs the compression process as described above so as to generate the compressed data D2. More specifically, as shown in FIG. 6, the compressed data creating portion 100 is provided with a block dividing portion 101, a representative value calculating portion 102, an additional information calculating portion 103, and a coding portion 104.

The block dividing portion 101 divides the pseudo gradation image data FDh into a plurality of blocks. The representative value calculating portion 102 determines the representative value about density in each block. The additional information calculating portion 103 determines the additional information for each line in each block.

The coding portion 104 encodes the representative value, the additional information and the like. The coding portion 104 stores a decode table that is necessary for the encoding. This decode table is sent to the printer 13 in advance. Note that in the case where an interpolation rule for determining a density value of each pixel in each block TL by interpolation (that will be described later) is defined between the computer main body 11 and the printer 13, information about this interpolation rule is sent to the printer 13 in advance, if necessary.

In addition, when the encoding is performed, it is possible to encode the representative value as it is, for example. Instead, however, it is also possible to determine differential information between representative values of neighboring blocks TL so that the determined differential information is encoded. Thus, a compression ratio can be improved.

In FIG. 7, the printer 13 is made up of a dither pattern memory portion 360, a data reconstructing portion 300, a decode table memory portion 370, a laser drive portion 390, a print engine 400 and the like.

The dither pattern memory portion 360 keeps a similar one to the dither pattern DP that is stored in the dither pattern memory portion 160 of the computer main body 11. The dither pattern DP may be sent from the computer main body 11 in advance, or the same dither pattern DP may be stored in an appropriate memory that is built in the printer 13 in advance.

The decode table memory portion 370 stores the decode table DC sent from the computer main body 11.

The data reconstructing portion 300 receives the compressed data D2 from the computer main body 11 and reconstructs the received compressed data D2 so that a dot pattern that is the same as the original pseudo gradation image data FDh is reproduced. For the reconstruction process, a working memory 301 and a buffer memory 302 are provided. When the reconstruction process is performed, the dither pattern DP, the decode table DC or the like is referred to, if necessary. Note that the data reconstructing portion 300 is provided with a procedure or a rule for performing the reconstruction process corresponding to the compression process performed by the compressed data creating portion 100 as a program or a process circuit of hardware.

The laser drive portion 390 performs the intensity modulation process of the laser diode LD based on the image data that were read out of the buffer memory 302 so that the laser diode LD emits light. The print engine 400 prints on a paper sheet by the electrophotographic method as described above.

[Contents of Compression Process and Expansion Process]

Next, contents of processes performed by the compressed data creating portion 100 and the data reconstructing portion 300 will be described more in detail.

In FIG. 8, an example of pseudo gradation image data FDh of one page is shown. The pseudo gradation image data FDh are divided into many blocks TL arranged in a matrix. Although the representative value and the additional information are generated from the pseudo gradation image data FDh here, a constitution is possible in which the representative value and the additional information are generated from the image data FD without the pseudo gradation step as described later. In the example shown in FIG. 8, the pseudo gradation image data FDh are divided into five blocks TL in the line direction. The area of the five blocks TL1-TL5 arranged on the line is one band BD. Each of the blocks TL is an area including 4 pixels vertically and 6 pixels horizontally. In other words, the block TL has a size corresponding to four lines in the sub scan direction. All the density values of the pixels GS included in this block TL is expressed by the representative value AP. Alternatively, they are expressed by one representative value AP and the additional information FJ of each line.

As a method of determining the representative value AP, various methods can be used. Here, a value selected from specific density values such that a pseudo gradation image obtained by performing the pseudo gradation process on a specific density value using the dither pattern that was used for the pseudo gradation process of the pseudo gradation image data FDh matches image data of the block TL is used as the representative value. In this case, therefore, a value between a minimum value K of threshold values in the case where the threshold value of the dither pattern is larger than a density value of the pseudo gradation image data FDh and a maximum value J of threshold values in the case where the threshold value of the dither pattern DP is smaller than the density value of the pseudo gradation image data FDh is used as the representative value, for example.

Furthermore, there are various methods for determining the additional information FJ. Here, it is decided whether or not the image data on each line in the block TL are reproduced appropriately by the representative value. If it is decided that they are not reproduced appropriately, other data, for example the image data FD on the line are used as the additional information, or appropriate information for modifying so that they are reproduced appropriately is used as the additional information.

FIG. 9 shows a case where representative values AP1-AP5 are inputted for a certain band BD. The representative values AP1-AP5 for one band are recorded in the working memory 301 in this order. The representative values AP1-AP5 recorded in the working memory 301 are kept in the working memory 301 until the reconstruction for the band BD is finished. When the representative value AP of the next band BD is inputted, it is rewritten with the representative value AP.

A first line is reconstructed based on the representative value AP recorded in the working memory 301. First of all, based on the representative value AP1, a first block TL1 is reconstructed, and the reconstructed data D3 thereof are recorded (written) in the buffer memory 302 at a position corresponding to the block TL1. Next, based on the representative value AP2, a second block TL2 is reconstructed, and the reconstructed data D3 thereof are recorded in the buffer memory 302 at a position corresponding to the block TL2.

Next, based on the representative value AP3, a third block TL3 is to be reconstructed. In this example, the representative value AP3 is the extended representative value, so it cannot be reconstructed based on the representative value AP3. In this case, the additional information FJ of the first line in the block TL3 is used, and it is reconstructed by the additional information FJ. The reconstructed data D3 thereof are recorded in the buffer memory 302 at a position corresponding to the block TL3. Note that the additional information FJ is also recorded in the working memory 301. However, the additional information FJ can be overwritten by new one when reconstruction of the lines in the block is finished. Therefore, the additional information FJ is merely recorded temporarily in the working memory 301. Since the additional information FJ is used only when the lines in the block are reconstructed, it is not necessarily required to be recorded. It is possible not to record the additional information FJ if the reconstruction can be performed sufficiently in relationship between reception speed and reconstruction speed.

Based on the representative value AP4, a fourth block TL4 is reconstructed, and the reconstructed data D3 are recorded in the buffer memory 302 at a position corresponding to the block TL4. Although a fifth block TL5 is to be reconstructed based on the representative value AP5, it cannot be reconstructed by the representative value AP5 in this example. It is reconstructed by the additional information FJ of the first line in the block TL5, and the reconstructed data D3 thereof are recorded in the buffer memory 302 at a position corresponding to the block TL5.

The reconstructed data D3 that are contents of the buffer memory 302 are read out from the first address of the buffer memory 302 in turn and sent to the laser drive portion 390.

When the reconstructed data D3 are read out of the buffer memory 302, the reconstruction of the second line is performed. In the reconstruction of the second line, the third and the fifth blocks TL3 and TL5 are reconstructed based on the additional information FJ of the second lines of the blocks TL3 and TL5, respectively.

Since it is possible to write in the buffer memory 302 right after reading the reconstructed data D3, the reconstruction of the second line is performed without waiting for completion of reading all the reconstructed data D3 of the first line.

Then, concerning the second line too, the reconstructed data D3 recorded in the buffer memory 302 are read sequentially and sent to the laser drive portion 390.

In this way, until the fourth line, it is performed sequentially to record the reconstructed data D3 based on the representative values AP1-AP5 and the additional information FJ as well as to read the recorded reconstructed data D3. Thus, reconstruction of one band is performed. After completion of the reconstruction of one band, the next band BD is reconstructed successively.

Here, reading of the reconstructed data D3 out of the buffer memory 302 is performed in synchronization with a speed of image formation in the print engine 400. Therefore, when the reading from the buffer memory 302 is once started, it is necessary to maintain the speed of reading until all the image data FD is formed completely. Therefore, it is necessary to set the speed of recording the reconstructed data D3 in the buffer memory 302 to a value higher than the speed of reading the reconstructed data D3. In other words, it is controlled in the state where the reconstructed data D3 of the next line are recorded after waiting the reconstructed data D3 is read.

In this way, when one band BD is reconstructed, the representative values AP1-AP5 are used repeatedly four times for four lines, and the additional information FJ of each line is used only once for the corresponding line.

The reconstruction of the first line may be performed after all the representative values AP1-AP5 are recorded in the buffer memory 302. Alternatively, it may be performed simultaneously while each of the representative values AP1-AP5 is recorded in the buffer memory 302.

Furthermore, in the reconstruction of the first line, the reconstruction based on the additional information FJ may be performed at the timing when the reconstruction of the block TL based on the representative value AP should be performed. Alternatively, it may be performed after all the reconstruction is finished for the block TL in which the reconstruction can be performed based on the representative value AP.

Note that the control for this reconstruction process can be performed by a process circuit provided to the data reconstructing portion 300 or by executing a program as described above.

[Explanation with Reference to Flowcharts]

Next, procedures of the compression process and the expansion process will be described with reference to flowcharts shown in FIGS. 10 and 11.

Figure 10:
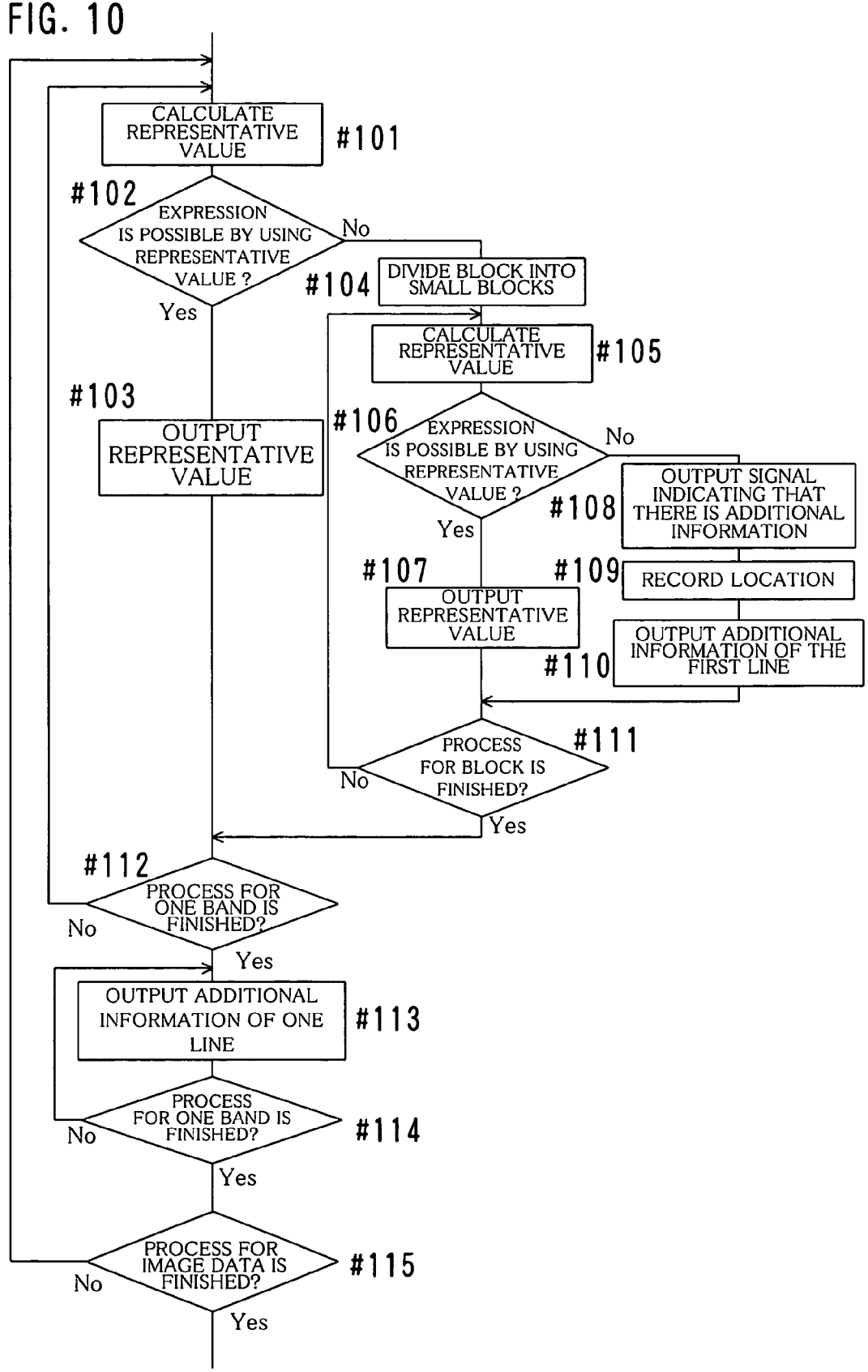
FIG. 10 is a flowchart showing another example of a compression process.
Figure 11:
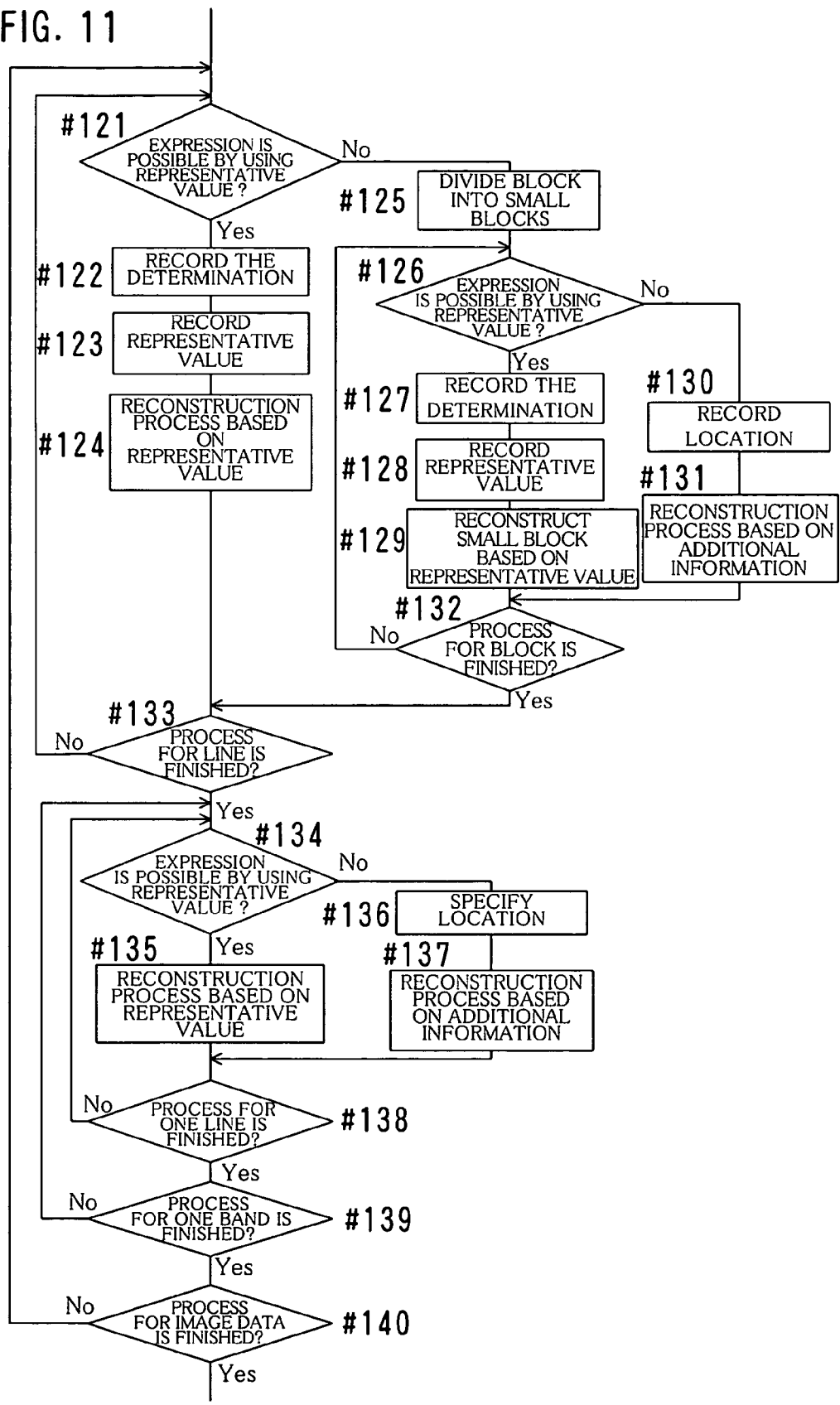
FIG. 11 is a flowchart showing another example of an expansion process.

FIG. 10 is a flowchart showing an example of the compression process and, FIG. 11 is a flowchart showing an example of the expansion process.

Figure 12:
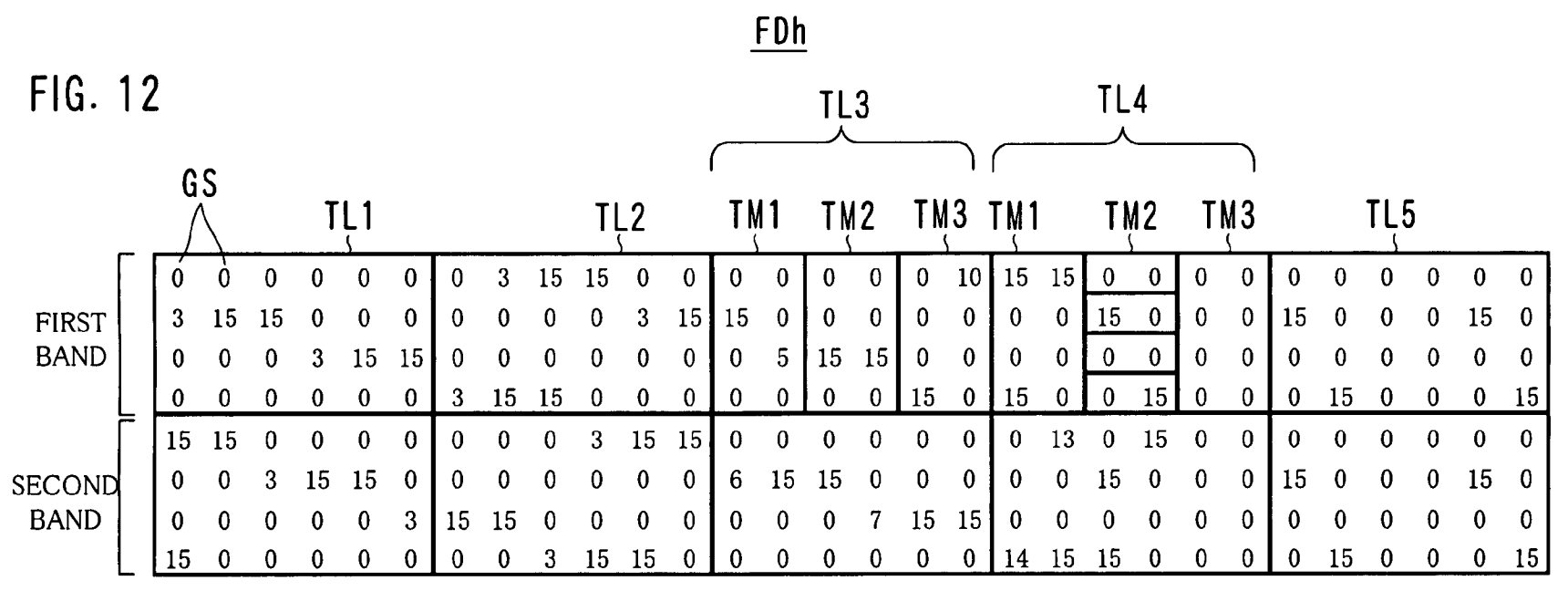

In the flowcharts shown in FIGS. 10 and 11, if the true representative value cannot be determined in a certain block TL, the block TL is redivided into a plurality of small blocks TM (see FIG. 12). In accordance with a size of the block TL, it is redivided into three small blocks TM, for example. The redivision is performed so that the small blocks TM are arranged in a lateral direction (line direction). Thus, the small block TM and the block TL have the same size in the vertical direction. As a result, when the representative value AP is determined for the small block TM, the representative value AP can be used for all the lines of the band BD in the same way as the case of the block TL. As to the small block TM too, the representative values AP and the additional information FJ for each line if necessary are determined.

More specifically, in FIG. 10, when the representative value AP is determined (#101), if the representative value AP is the true representative value (Yes in #102), the representative value AP is outputted (#103). If it is not the true representative value (No in #102), the block TL is redivided into small blocks TM (#104), and the representative value AP for one small block TM is determined (#105). If the determined representative value AP is the true representative value (Yes in #106), the representative value AP is outputted (#107). If it is not the true representative value (No in #106), a signal indicating that there is additional information FJ is generated and outputted (#108). Information indicating a position (location) of the small block TM is recorded (#109), and the additional information FJ of the first line for the small block TM is outputted (#110). This is repeated for all the small blocks TM (#111). It is possible to output the additional information FJ of the first line in the step #110 not at this timing but at another timing that is the same as the timing for a second or later line.

When the output of the representative values AP of the block TL or the small block TM is finished for one band BD (Yes in #112), the additional information FJ of the second line and the subsequent lines of each of the blocks TL or the small blocks TM is outputted (#113). When this outputting process is finished for one band (Yes in #114), the steps #101-#114 are repeated for the next one band BD. When the outputting is completed for all the image data, the process is finished (#115).

In FIG. 11, if the inputted representative value AP is the true representative value (Yes in #121), it is recorded in the working memory 301 that the reconstruction is possible based on the representative value AP, and the representative value AP is also recorded (#122 and #123). Then, the reconstruction of the first line based on the representative value AP is performed (#124). If it is not the true representative value (No in #121), for the small block TM (#125), if the representative value AP is the true representative value (Yes in #126), information that the small block TM can be reconstructed based on the representative value AP as well as the representative value AP are recorded in the working memory 301 (#127 and #128). The reconstruction of the first line of the small block TM based on the representative value AP is performed (#129). If the representative value AP is not the true representative value (No in #126), based on the record of location (#130), the reconstruction of the first line in the small block TM is performed by the additional information FJ (#131). The process of the small block TM is repeated until it finishes for one block TL (#132). The process of the representative value AP and the first line is repeated until it finishes for one band (#133).

Then, for the second and the subsequent lines of the band BD, if the representative value AP is the true representative value, the reconstruction of one line based on the representative value AP is performed (#134 and #135). If it is not the true representative value, based on the information specifying the location (#136), the reconstruction of one line by the additional information FJ is performed (#137). The process is repeated for the entire one line (#138), and it is repeated for the entire one band (#139). When the reconstruction is completed for all the image data, the process finishes (#140).

In this way, if the expression by the representative value AP is not sufficient in a certain block TL, the block TL is redivided so as to reduce the size for searching the representative value AP. Thus, although the process becomes complicated a little, higher performance of compression can be obtained. Furthermore, in the expansion process of this case too, expansion of the image can be performed by using the buffer memory 302 having a small capacity without using a buffer memory having the same capacity as the band BD.

The data size can be reduced by encoding because the additional information FJ has a substantially uneven distribution compared with the original value. Since the representative value AP of the block TL is separated from the additional information FJ and the additional information FJ is generated by the line, the reconstruction can be performed by the line in the expansion process. Therefore, one line of the buffer memory 302 is sufficient to be used for the expansion, so the memory capacity can be reduced. Thus, the memory can be embedded in an ASIC or the like easily, and high speed and low cost of the image expansion can be realized.

[Explanation Using Concrete Examples]

Next, concrete examples of the compression process and the expansion process will be described.

Figure 14:
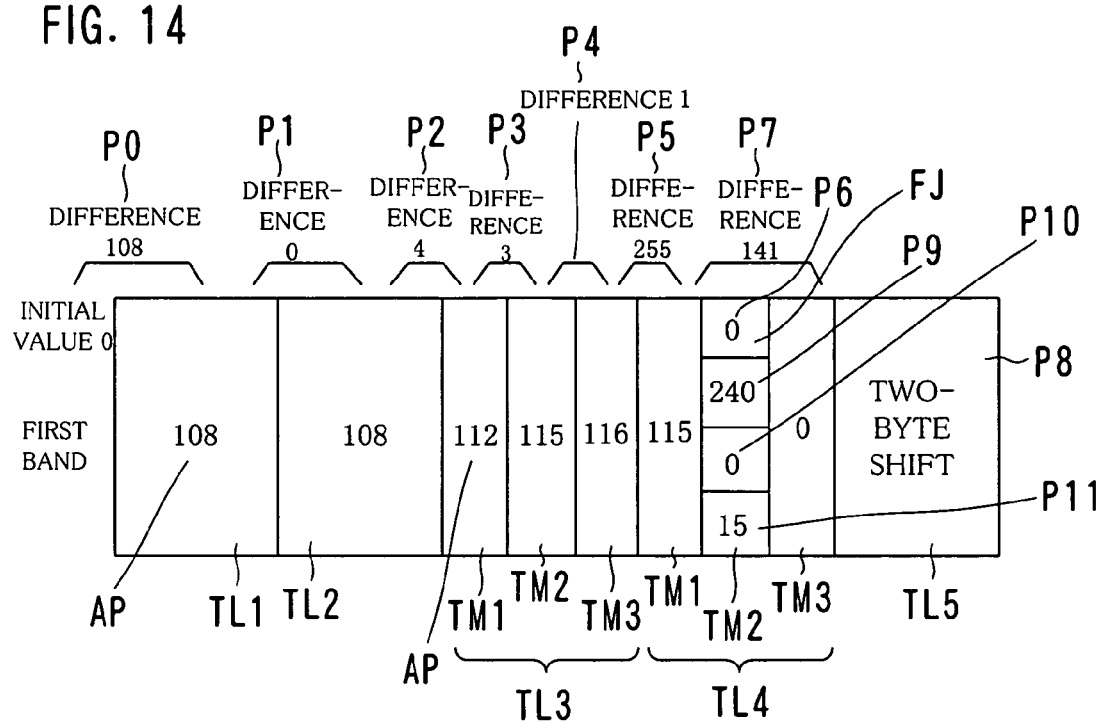
FIG. 14 is a diagram showing representative values of the first band.
Figure 15:
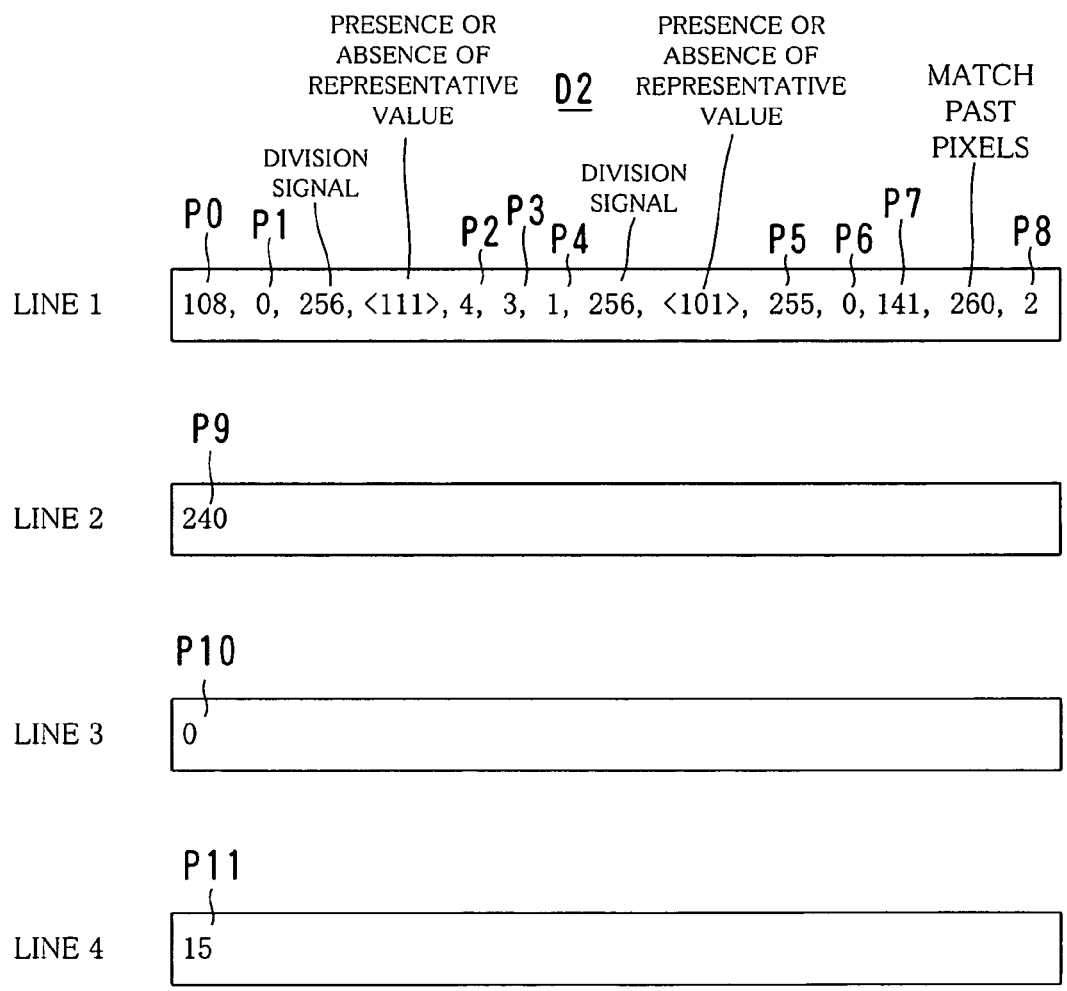
FIG. 15 is a diagram showing compressed data of the first band.
Figure 17:
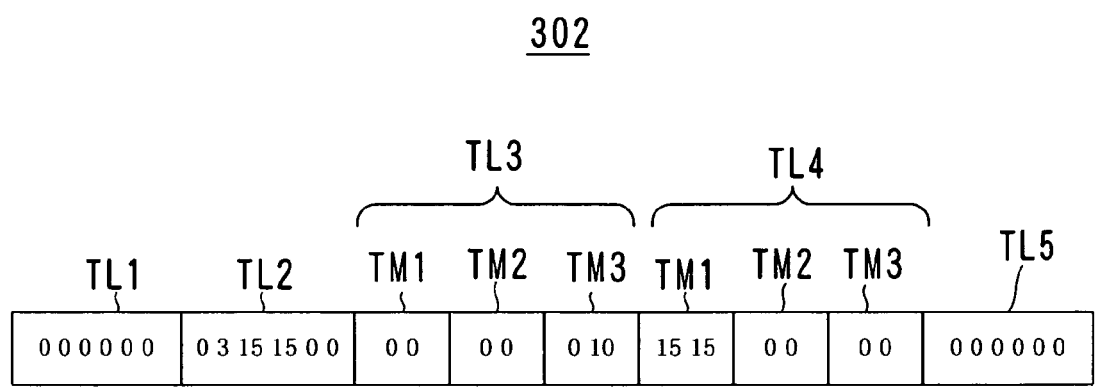
FIG. 17 is a diagram showing an example of contents of a buffer memory.

FIG. 12 is a diagram showing an example of the pseudo gradation image data FDh, FIGS. 13A and 13B are diagrams showing an example of the dither pattern DP, FIG. 14 is a diagram showing representative values AP of the first band of the pseudo gradation image data FDh shown in FIG. 12, FIG. 15 is a diagram showing compressed data D2 of the first band of the pseudo gradation image data FDh shown in FIG. 12, FIG. 16 is a diagram showing contents of the working memory 301 in which the compressed data D2 is recorded in the expansion process shown in FIG. 15, and FIG. 17 is a diagram showing contents of the buffer memory 302 in which the image data reconstructed for the first line are recorded.

In FIG. 12, the pseudo gradation image data FDh are image data having sixteen values. Therefore, each pixel GS can have a value within 0-15 in decimal. The pseudo gradation image data FDh is divided into five in the line direction, so it is divided into blocks TL of 4 pixels vertically and six pixels horizontally. In other words, one band consists of four lines. In the first band, the third and the fourth blocks TL3 and TL4 are further redivided into three small blocks TM1-TM3, respectively.

The dither pattern DP that was used for obtaining the pseudo gradation image data FDh has a size corresponding to 20 pixels in the vertical direction and 20 pixels in the horizontal direction as shown in FIGS. 13A and 13B. FIG. 13A shows an address of each pixel in the dither pattern DP. This dither pattern DP has fifteen threshold values for each pixel as shown in FIG. 13B. An output value depends on threshold values between which an input value is located.

For example, if the value that is inputted to the pixel of "A00-00" (a density value of the pixel of the image data FD corresponding to the position of "A00-00") is "108", it is smaller than "123" that is a first threshold value of "A00-00". Therefore, the output (the pseudo gradation image data FDh) becomes "0". Even if it is the same "108" input, if the pixel corresponding to the input value is the pixel of "A01-00", the input value "108" is between "107" that is a third threshold value and "110" that is a fourth threshold value, so the output becomes "3". In addition, in the case of the pixel of "A01-01", the input value "108" is larger than "45" that is a fifteenth threshold value, so the output becomes "15". By this pseudo gradation process, the image data FD are converted into the pseudo gradation image data FDh. Note that a size and a threshold value of the dither pattern DP are not limited to these, and different dither patterns may be used for each color of CMYK or the like.

In FIG. 14, the representative value AP of each of the blocks TL or the small blocks TM is shown. The representative values AP of the first block TL1 and the second block TL2 are both "108". As to the third block TL3, the representative values AP of the first through the third small blocks TM1-TM3 are "112", "115" and "116", respectively. These representative values AP are adapted to be values such that the pseudo gradation image data FDh can be obtained by inputting the values to the dither pattern DP described above in a position of a pixel in the block.

As to the fourth block TL4, the second small block TM2 thereof has no representative value AP, and the additional information FJ is indicated in each line. This additional information FJ is shown by decimal when value of two pixels GS in each line is regarded as one-byte data.

As to the fifth block TL5, the arrangement of pixels GS in the block TL5 is the same as that of pixels GS four pixels (i.e., two bytes) before, so it is shown as "two-byte shift".

In addition, as to each representative value AP, a difference from the representative value AP of the neighboring block TL or small block TM is shown. The difference is obtained by subtracting the previous representative value AP from the current representative value AP. If a value of the previous representative value AP is larger than a value of the current representative value AP, "256" is added to the value of difference to make a positive value. More specifically, an initial value is "0", and a difference between the initial value and the first representative value AP is "108". A difference between the first and the second representative values AP is "0". A difference of the representative value AP between the second block TL2 and the first small block TM1 of the third block TL3 is "4". A difference of the representative value AP between the first and the second small blocks TM of the third block TL3 is "3". A difference between the third small block TM3 of the third block TL3 and the first small block TM1 of the fourth block TL4 is "255" obtained by adding "256" to the value of difference "−1".

"P0", "P1", "P2" and the like shown in FIG. 14 indicates an order of outputted as the compressed data D2.

In FIG. 15, the compressed data D2 for the first line is shown as "LINE 1". In "LINE 1", "108" is outputted first that is a difference of the representative value AP in the first block TL1, and "0" is outputted next that is a difference of the representative value AP in the second block TL2. Then, "256" is outputted next that is a division signal indicating that the third block TL3 is divided, together with "<111>" that indicates the presence or absence of the representative value AP for each of the divided small blocks TM1-TM3. The data "<111>" indicating the presence or absence of the representative value AP are three-bit data, and each position thereof indicates positions of small blocks TM1-TM3, respectively, where "1" indicates the presence of the representative value while "0" indicates the absence of the same.

Then, "4", "3" and "1" are outputted that are differences of the representative values AP of the first through the third small blocks TM1-TM3 in the third block TL3. Next, "256" is outputted, which is the division signal of the fourth block TL4, together with "<101>" that indicates the presence or absence of the representative value AP for each of the small blocks TM. The data "<101>" indicating the presence or absence of the representative value AP of the small block TM shows that the second small block TM2 has no representative value AP. Therefore, the small block TM2 will be reconstructed later based on the additional information FJ. As to the first line, "0" that is the additional information FJ is outputted next.

Then, "141" is outputted, which is a difference of the representative value AP in the first and the third small blocks TM1 and TM3 of the fourth block TL4. Next, "260" is outputted, which indicates that the fifth block TL5 matches the pixel GS in the past, together with "2" that is the number of bytes of the shift.

According to the compressed data D2 of the first line up to this, all the representative values AP of the first band and the additional information FJ of the first line in the first band are shown.

Next, in the second line, the additional information FJ of the second line in the second small block TM2 of the fourth block TL4 is outputted. In the third and the fourth lines, the additional information FJ of the third and the fourth lines in the same small block TM2 is outputted.

Similar process is performed for other bands, and coding is performed so that the created compressed data D2 are transmitted to the printer 13.

A process circuit or a program for performing this compression process is provided to the compressed data creating portion 100. A process circuit or a program for performing the reconstruction process in the procedure corresponding to the compression process is provided to the data reconstructing portion 300. The printer 13 that has received the above-mentioned compressed data D2 performs the following reconstruction process.

As shown in FIG. 16, the working memory 301 has recording positions of the compressed data D2 corresponding to each of the blocks TL1-TL5. Based on the compressed data D2 of the first line, data to be recorded in the working memory 301 are calculated and are recorded at each position. At the position corresponding to the first block TL1, as shown in FIG. 16 at the upmost position, "108" that is the representative value AP of the block TL1 is recorded in the number of three that is the same as the number of small blocks TM in the redivision. Thus, the number of the representative values AP does not change regardless of the presence or absence of the redivision. It is possible to perform the reconstruction by the small block TM in this way. It is also possible to record only one representative value AP.

Under the representative value AP, there are "<0>" that is information indicating the expansion method, "<0>" that is information indicating the presence or absence of the redivision, "<000>" that is information indicating the presence or absence of the representative value AP upon the redivision, and "<0>" that is information indicating the dither pattern DP that was used, which are recorded in this order.

As to the information indicating the expansion method, "0" indicates the expansion by using the dither pattern DP, and "1" indicates the expansion by duplicating past data. As to the information indicating the presence or absence of the redivision, "0" indicates the absence of the redivision while "1" indicates the presence of the redivision. As to the information indicating the presence or absence of the representative value AP upon the redivision, "0" indicates the absence of the representative value while "1" indicates the presence of the representative value. The information indicating the dither pattern that was used is a code for specifying the dither pattern DP.

Therefore, as to the block TL1, it is shown that the dither pattern DP is used for the expansion, the absence of the redivision, and the dither pattern DP having the code "0" is used.

In addition, as to the second block TL2, three of "108" are recorded, which is the representative value AP of the block TL2, and the expansion using the dither pattern DP, the absence of the redivision, and using the dither pattern DP of the code "0" are recorded.

As to the third block TL3, concerning three small blocks TM1-TM3, the representative values AP thereof that are "112", "115" and "116", respectively, the expansion by using the dither pattern DP, the presence of the redivision, each of the small blocks TM1-TM3 having the representative value AP, and using the dither pattern DP of the code "0" are recorded.

As to the fourth block TL4, concerning two small blocks TM1 and TM3, representative values AP thereof that are "115" and "0", the center small block TM2 being reconstructed based on the additional information FJ without no value as the representative value AP, the expansion by using the dither pattern DP, the presence of the redivision, only two small blocks TM1 and TM3 having the representative value AP, and using the dither pattern DP of the code "0" are recorded.

As to the fifth block TL5, "2" that is the number of bytes of the shift to the past data, the expansion by duplicating the past data, and the absence of the redivision are recorded.

The reconstruction is performed based on the compressed data D2 such as the representative value AP recorded in the working memory 301 and the additional information FJ of each line.

As shown in FIG. 17, the reconstruction is performed for the first line. More specifically, as to the first block TL1, the pseudo gradation process is performed by using the representative value "108" by the dither pattern DP of the code "0" so that values about densities of pixels (pixel values) of the pseudo gradation image data FDh is reproduced, and the pixel values as a result are recorded in the buffer memory 302 at the position of the block TL1. Next, as to the second block TL2, the reconstruction process is performed by using the representative value "108" by the dither pattern DP of the code "0", and the result is recorded in the buffer memory 302 at the position of the block TL2. The output values (pixel values) of the reconstruction process are different even if the same dither pattern DP is used, because the positions of pixels of the dither patterns DP that are used are different. As to the third block TL3, the reconstruction process is performed by using the representative value "112", and the result is recorded at the position of the first small block TM in the block TL3. Similarly, the reconstruction process is performed by using the representative values "115" and "116", and the results are recorded at the positions of the second and the third small blocks TM.

As to the fourth block TL4, the reconstruction process is performed by using the representative value "115", and the result is recorded at the position of the first small block TM. The reconstruction is performed by using "0" that is the additional information FJ of "LINE 1", and the result is recorded at the position of the second small block TM. Further, the reconstruction process is performed by using the representative value "0", and the result is recorded at the position of the third small block TM.

As to the fifth block TL5, data two bytes before are duplicated, and the result is recorded at the position of the fifth block TL5. In this case, there may be insufficient data by one duplication, so the duplication is repeated a plurality of times.

In addition, as to the second through the fourth lines in the same way, the reconstruction is performed based on the representative value AP recorded in the working memory 301 and the additional information FJ of the second through the fourth lines.

[Example of how to Determine the Representative Value]

Figure 18:
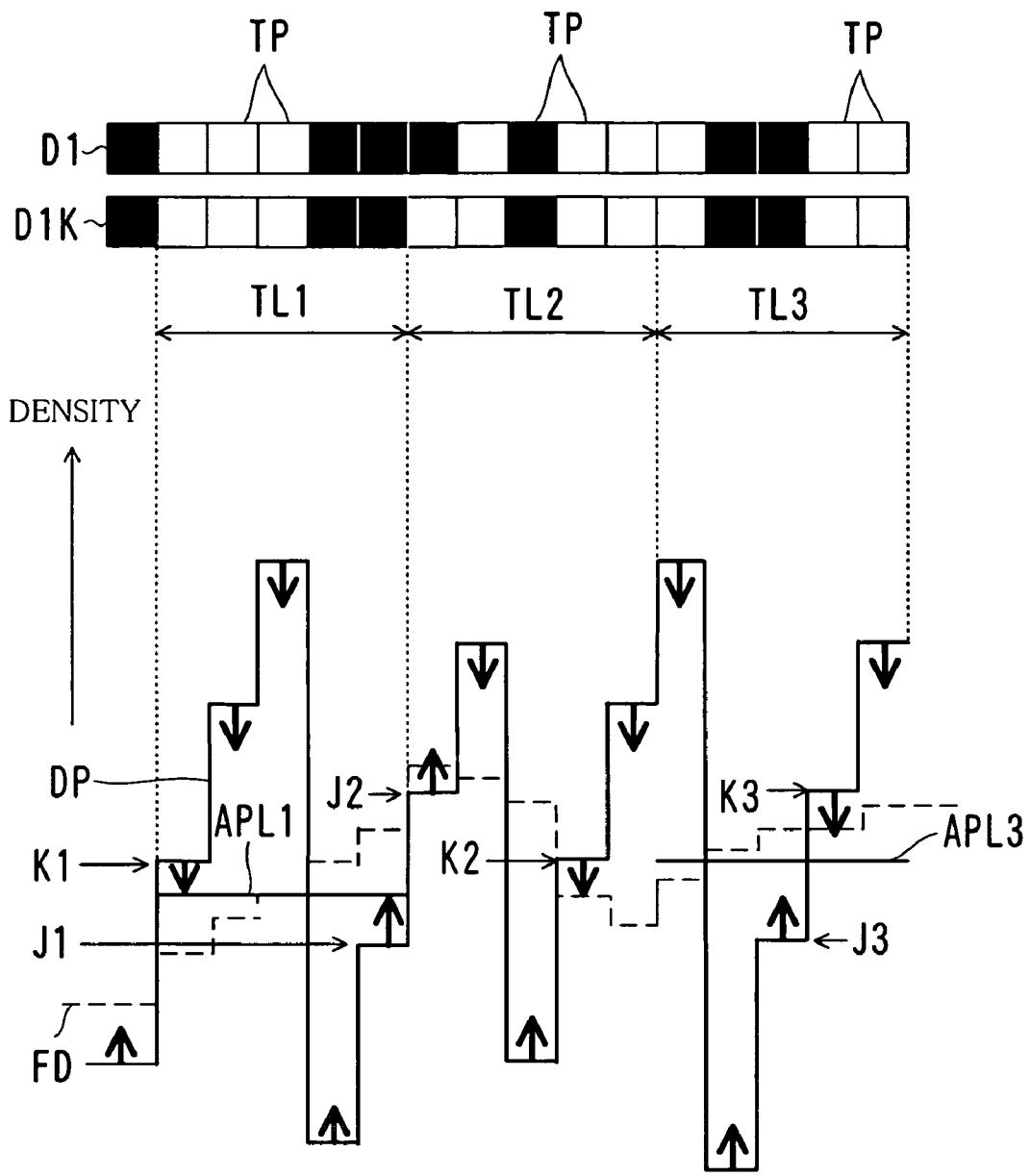
FIG. 18 is a diagram for explaining another example of a method for obtaining a representative value.
Figure 20A:
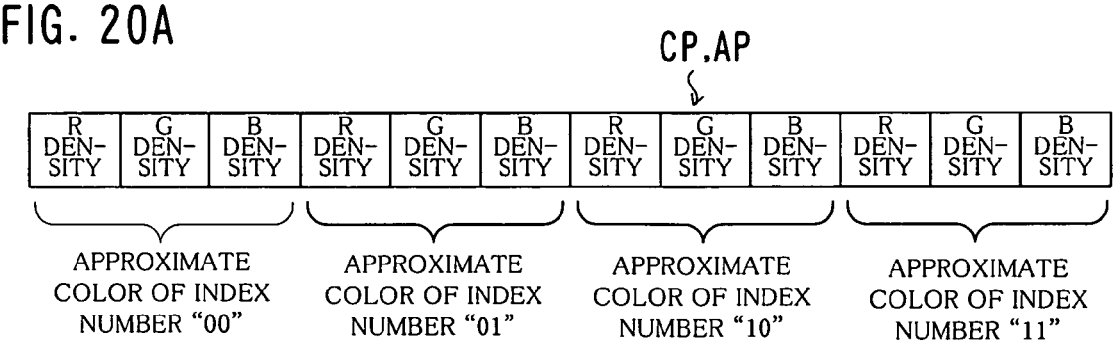
FIGS. 20A and 20B are diagrams showing the representative value and the additional information when the BTC method is applied.
Figure 20B:
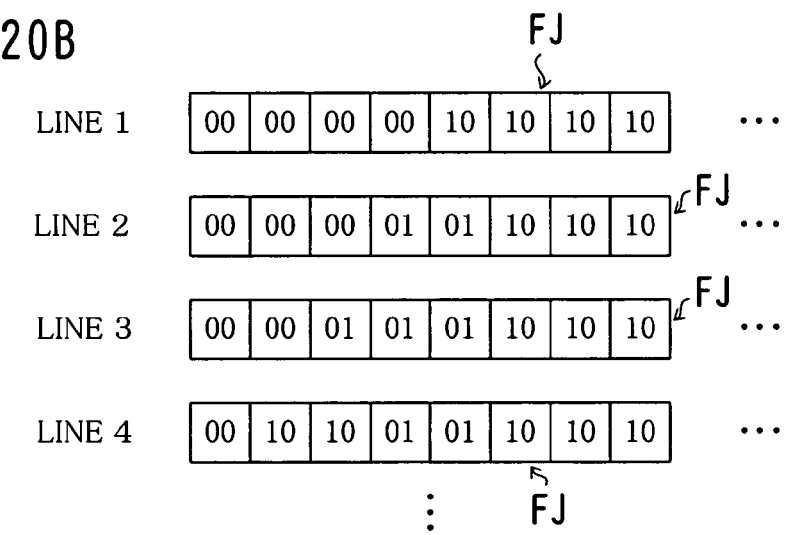
Figures 22A, 22B, 22C:
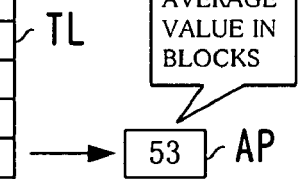
FIGS. 22A-22C are diagrams for explaining the expansion process when an average value of the density values in the block is used as the representative value.

FIG. 18 is a diagram for explaining another example of a method for obtaining a representative value, FIGS. 19A-19C are diagrams for explaining a BTC method, FIGS. 20A and 20B are diagrams showing the representative value AP and the additional information FJ when the BTC method is applied, FIG. 21 is a diagram for explaining the expansion to the buffer memory, and FIGS. 22A-22C are diagrams for explaining the compression process when the average value of the density values in the block TL is used as the representative value.

Although the representative value AP is determined from the pseudo gradation image data FDh, the image data FD and the dither pattern DP are used for determining the representative value in the example shown in FIG. 18. Note that the pixel value of each block TL is changed from the example described above for explanation.

In FIG. 18, the representative value of the first block TL1 is determined first. A minimum value K1 of the threshold value in the case where the threshold value of the dither pattern DP is larger than the density value of the image data FD and a maximum value J1 of the threshold value in the case where the threshold value of the dither pattern DP is smaller than the density value of the image data FD are determined. Then, the representative value AP is selected between the minimum value K and the maximum value J of the threshold value. In other words, a value of the representative value AP that satisfies the following expression (1) is determined.

$$J \leq AP \leq K \qquad (1)$$

In this way, a range of the possible representative value AP (a representative value range) is a range from the maximum value J to the minimum value K. In FIG. 18, an example of the representative value AP1 of the block TL1 is shown by a horizontal straight line APL1.

As to the second block TL2, the minimum value K2 is smaller than the maximum value J2, so there is no representative value AP that satisfies the above expression (1). In this case, therefore, an appropriate value is set temporarily as the representative value AP2. If a difference between a pseudo gradation image D1K obtained based on the temporarily set representative value AP2 and a pseudo gradation image D1 based on the original image data FD is within a predetermined error range, this representative value AP2 is used. However, some deterioration of the image quality may be generated. If the difference is not within the error range, other data, e.g., the image data FD itself may be used.

As to the third block TL3, there is a value of the representative value AP3 that satisfies the above expression (1). Therefore, such an appropriate representative value AP3 is determined.

Although FIG. 18 shows a relationship between the image data FD and the dither pattern DP in the line direction, each of the blocks TL has extension in both the line direction and the sub scan direction. Therefore, the same method is also applied to the sub scan direction.

In this embodiment shown in FIG. 18 too, it is possible to perform a conversion into various multi values such as two values, three values, four values, eight values or sixteen values as the pseudo gradation process.

In addition, it is possible to determine the representative value by applying the encoding method of BTC (Block Truncation Coding) to this embodiment.

In the BTC method, the gradation image (multi gradation image) is divided into predetermined blocks TL, and the image of the block TL is replaced with an image that can be expressed by approximate colors that are fewer than the original image as shown in FIG. 19A so that quantity of data can be reduced. The approximate color can be determined as a representative color of pixels included in each group of pixels when pixels in the block TL are divided into a plurality of pixel groups based on density values of them. A concrete method for determining the approximate color is disclosed in Japanese unexamined patent publications No. 4-270473 and No. 9-83809.

Information about the determined approximate color is stored as a color palette (palette data) CP. As shown in FIG. 19B, this color palette CP indicates index numbers that are assigned to each of approximate colors in advance and the approximate color corresponding to each of the index numbers. In other words, the color palette CP is a palette indicating a plurality of gradation steps (or colors) for expressing pixels in the block TL with reducing the number of gradation steps (or colors) of the image data FD. Note that the approximate color is expressed by density values of R, G and B colors, for example. The color palette CP is generated for each of the blocks TL.

As shown in FIG. 19C, each pixel in the block TL is associated with the index number of the approximate color of the pixel.

By using the color palette CP and the index number associated with each pixel, it is possible to obtain the image that is expressed with the approximate colors as shown in FIG. 19A.

When this BTC method is applied to the compression method of this embodiment, the color palette CP of the block TL is used as the representative value AP of the block TL. If a color of a pixel is expressed by RGB for example, the color palette CP as shown in FIG. 20A is outputted as the representative value AP. The color palette CP shown in FIG. 20A indicates a density value of each of R, G and B colors of an approximate color corresponding to each index number. After this representative value AP is outputted for one band BD, the additional information FJ of the band BD is outputted next.

As the additional information FJ, data indicating the index number of the approximate color of each pixel are outputted. In the example of the block TL shown in FIG. 19A, the additional information FJ shown in FIG. 20B is outputted for each line. The compressed data D2 are generated by the representative value and the additional information.

When the expansion process is performed, the representative values AP (color palettes CP) of one band BD are recorded in the working memory 301 first as shown in FIG. 21. The image of the first line of the first block TL of the band is reconstructed approximately based on the color palette CP1 of the block TL and the additional information FJ of the first line of the block TL. More specifically, information of the approximate color of the index number indicated by the additional information FJ is obtained from the color palette CP1 recorded in the working memory, and it is reconstructed by the approximate color. The reconstructed data are recorded in the buffer memory 302 at the position corresponding to the block TL.

In the same way, an image of the first line is reconstructed based on a color palette CP2 of the next block TL and the additional information FJ of the first line of the block TL. When the reconstruction of the first line is finished for every block TL of the band BD, the reconstruction of the second line and the subsequent lines is performed in the same way. When the reconstruction is finished for every line in the band BD, the reconstruction is performed for the next band BD. When the reconstruction is performed for every band BD, the entire image data FD are reconstructed approximately.

As described in the above example, there are various methods for determining the representative value AP. Other than those, the following methods can be adopted.

(1) A density value of a specific pixel within the block TL is used as the representative value.

(2) An intermediate value of density values of all pixels or a plurality of pixels within the block TL is used as the representative value. In this case, an average value, a weighted average value, a root mean square value or the like may be used as the intermediate value. In addition, it is possible to calculate an average or the like of values except a singular point.

(3) An intermediate value of density values of a specific pixel and its surrounding pixels within the block TL is used as the representative value.

(4) A parameter for expressing the image data within the block TL by using a function is used as the representative value. Therefore, it is, for example, an argument of a function that approximates the original image data FD like a spline interpolation.

(5) Perform a decision about a temporarily determined representative value whether or not the image data can be reproduced appropriately by using the representative value. If it is decided that the image data can be reproduced appropriately, the temporarily determined representative value is used as a real representative value. For example, concerning a representative value for pseudo gradation image data FDh, the decision of the reproduction appropriateness is performed in the following procedure. One block TL is regarded as a noted block, and an appropriate interpolation rule is applied to the representative value of the noted block or representative values of the noted block and one or more blocks TL neighboring to the noted block. Then, density values of pixels included in the noted block are calculated by interpolation. The pseudo gradation process is performed on the calculated density value of each pixel by using the dither pattern that was used for the pseudo gradation process. Then, it is decided whether or not the pseudo gradation image obtained by the pseudo gradation process is reproduced with an error within a predetermined range from the original pseudo gradation image data FDh. If it is reproduced with an error within a predetermined range, it is decided that the reproduction appropriateness is good, and the representative value of the noted block is used as the real representative value. In this case, concerning the block TL that was regarded as the noted block first, there is no neighboring block whose representative value had been determined before. Therefore, its representative value may be determined by considering a density value of a pixel located on a periphery, in particular on a vertex or the like of the noted block.

Furthermore, as a method for determining the additional information FJ, the following methods can be adopted.
(1) A difference between a density value of a specific pixel on each line in the block TL and a representative value thereof is used as the additional information.
(2) A difference between an intermediate value of density values of pixels on each line in the block TL and the representative value thereof is used as the additional information. As the intermediate value, an average value, a weighted average value, a root mean square value or the like may be used. In addition, it is possible to calculate an average or the like of values except a singular point. Furthermore, it is preferable to unify the calculation methods of the intermediate value for the representative value and the additional information.
(3) If the parameter for expressing the image data in the block TL by using a function is used as the representative value, a difference between the density value of the pixel on each line in the block TL and the image data expressed by the function is used as the additional information.

Here, the case where an average value of the density values of the pixels in the block TL is used as the representative value, and a difference (difference value) between the average value and the density value of each pixel is outputted as the additional information will be described with reference to FIGS. 22A-22C.

FIG. 22A shows a block TL having a size corresponding to eight pixels in the vertical direction and eight pixels in the horizontal direction. Each pixel of the block TL indicates a density value of the pixel. In the example of FIG. 22A, an average value of the density values of the pixels is "53", and this value becomes the representative value AP of the block TL.

FIG. 22B indicates a difference value between the average value and the density value of each pixel. Therefore, the additional information FJ as shown in FIG. 22C is outputted for each line of the block TL.

In this example, the quantity of data appears to be hardly reduced because the difference value of every pixel is outputted as the additional information. In the actual image, however, the density value of an image in a block is usually uniform, so the image in the block can be expressed only by the representative value in most cases. Therefore, the quantity of data can be reduced.

In addition, although the case where the additional information FJ is created for each line is described in the above example, the memory capacity of the buffer memory 302 that is used for the expansion process can be reduced also in the case where the additional information FJ is created for a plurality of lines that is fewer than the number of lines included in each block TL, compared with the case where the additional information is created for the entire block TL.

Furthermore, when the representative value AP is calculated, it is possible to decide whether or not the image expressed only by the representative value AP is similar to the original image, and to add the additional information FJ only in the case where a predetermined similarity cannot be obtained. In this case, the similarity can be decided by determining whether or not an average of the absolute value of the difference between the original image and the representative value is larger than a predetermined value.

In addition, as an order of outputting the compressed data and a procedure of the expansion process, various methods can be adopted as follows.

Figure 23:
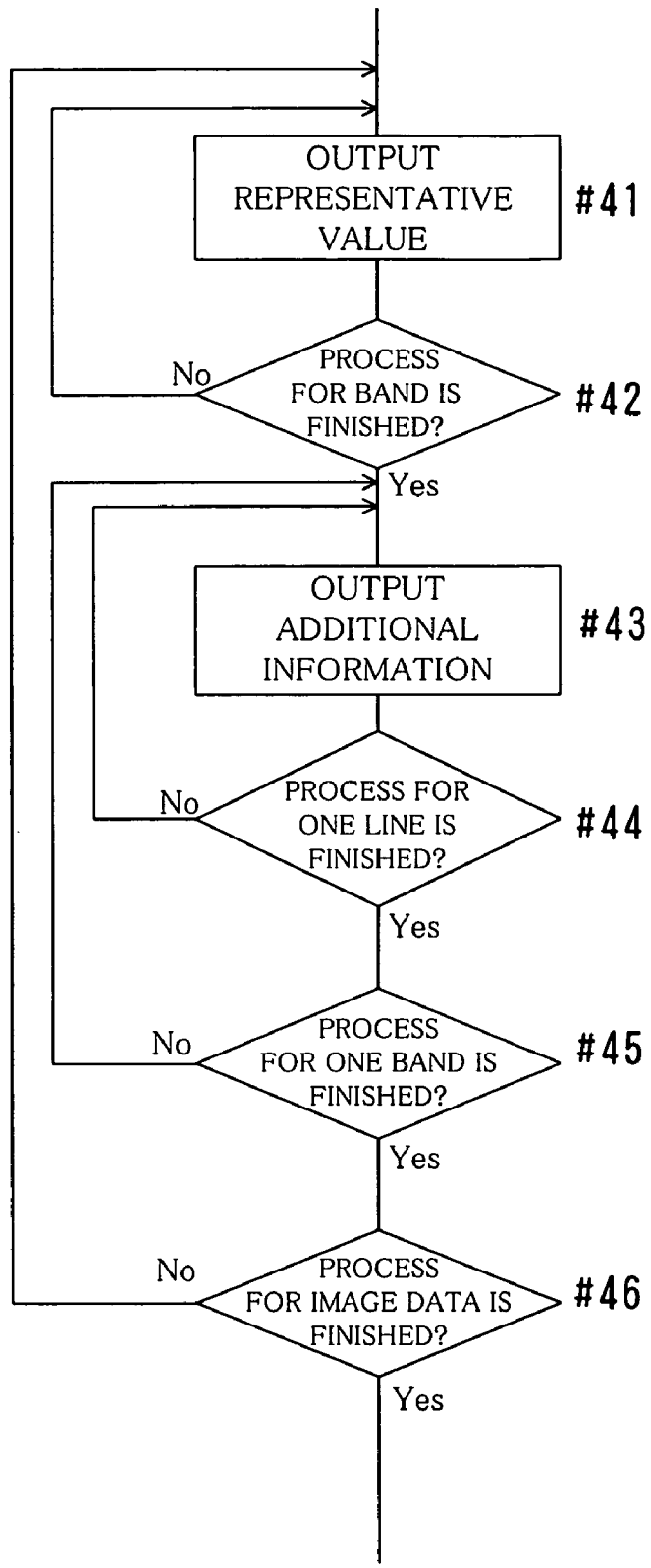
FIG. 23 is a flowchart showing an example of an order of outputting the compressed data.
Figure 24:
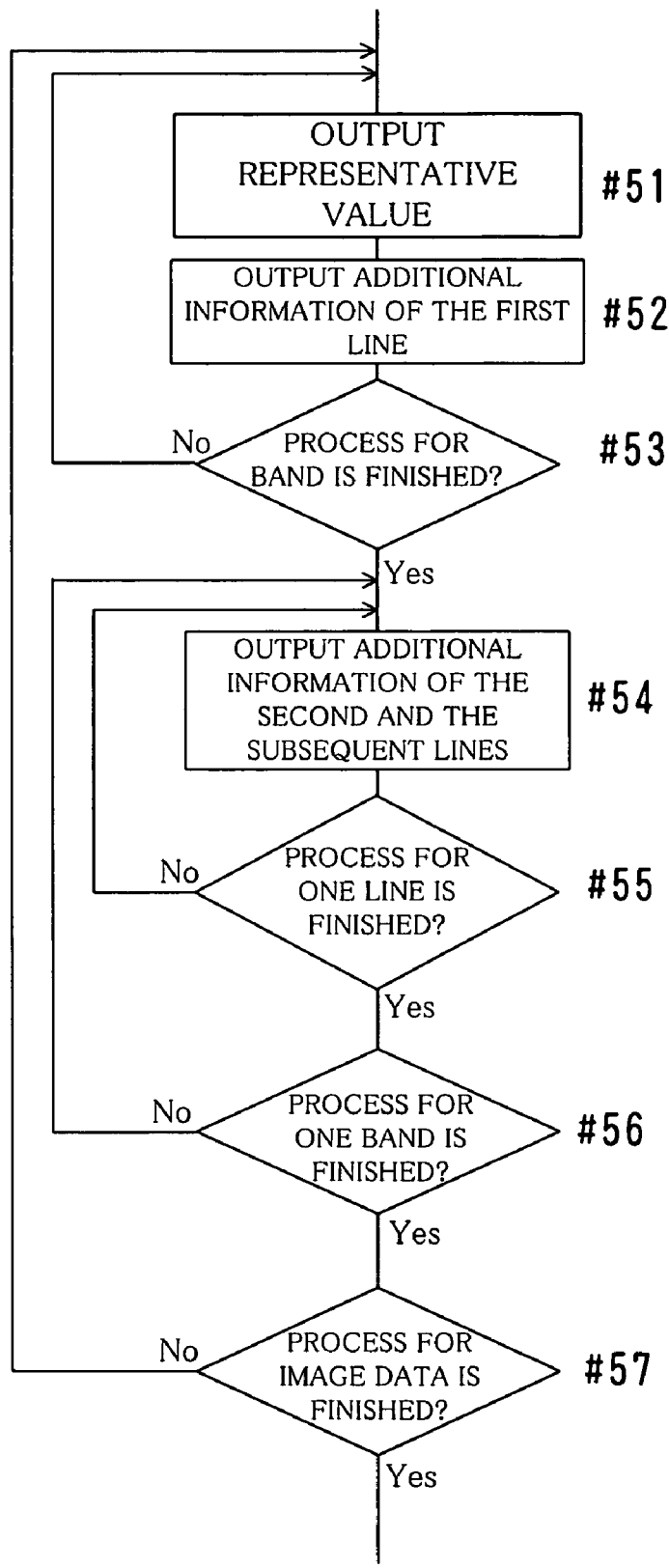
FIG. 24 is a flowchart showing another example of the order of outputting the compressed data.
Figure 25:
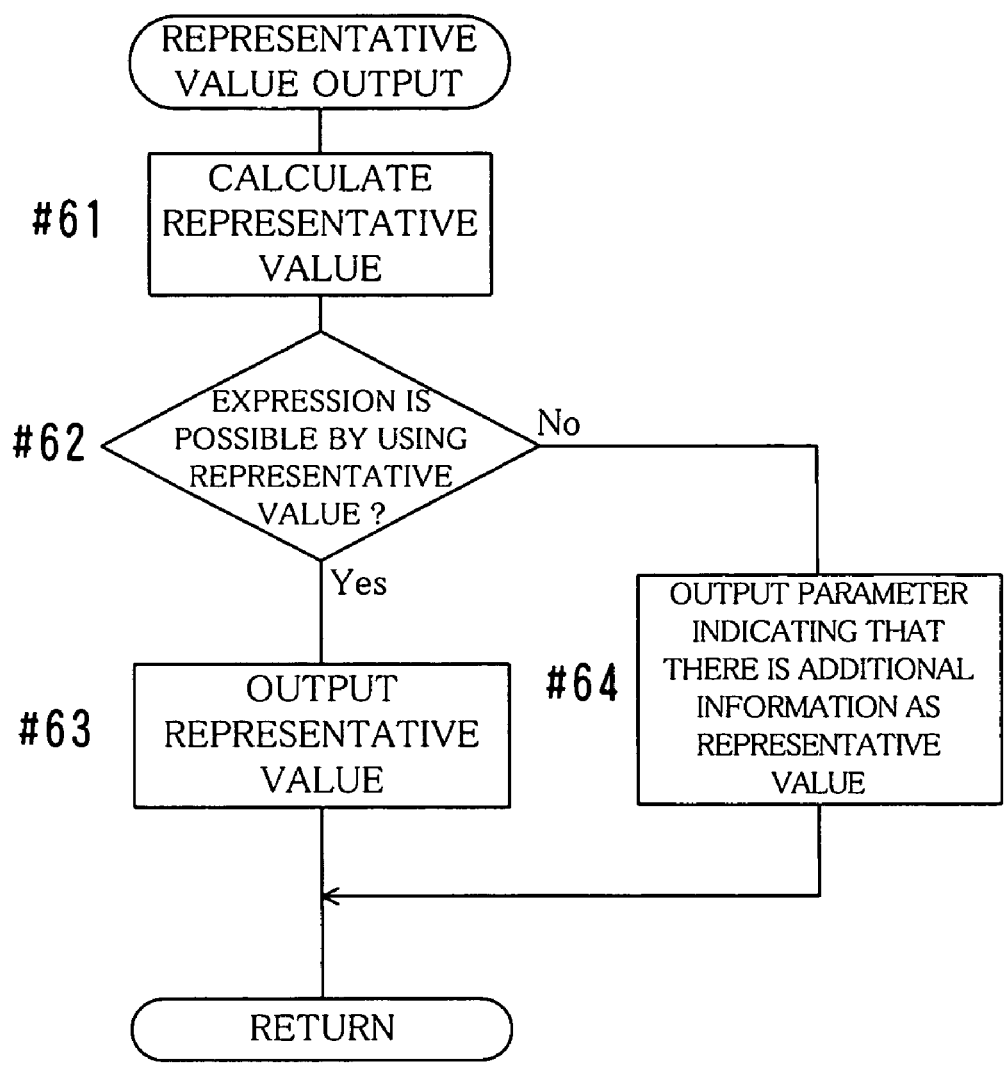
FIG. 25 is a flowchart showing an example of a procedure for outputting a representative value.
Figure 26:
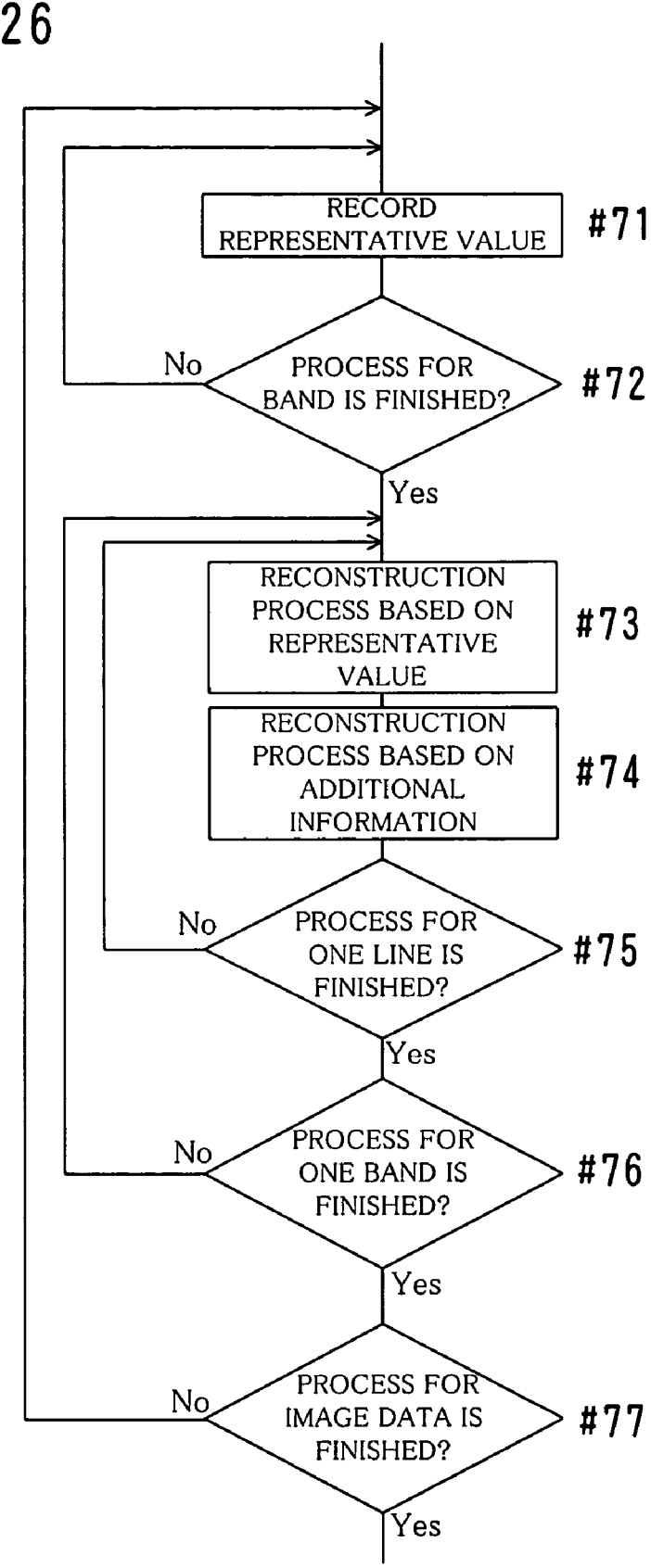
FIG. 26 is a flowchart showing an example of a procedure of the expansion process.
Figure 27:
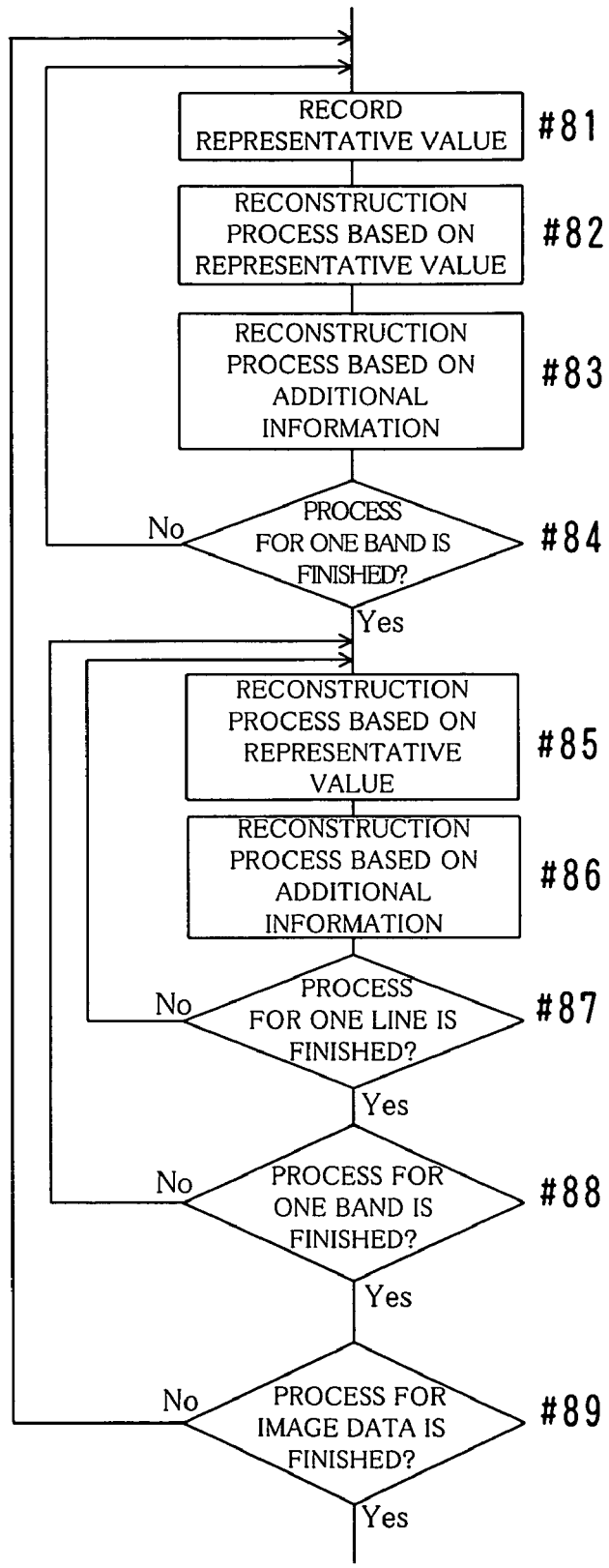
FIG. 27 is a flowchart showing another example of the procedure of the expansion process.
Figure 28:
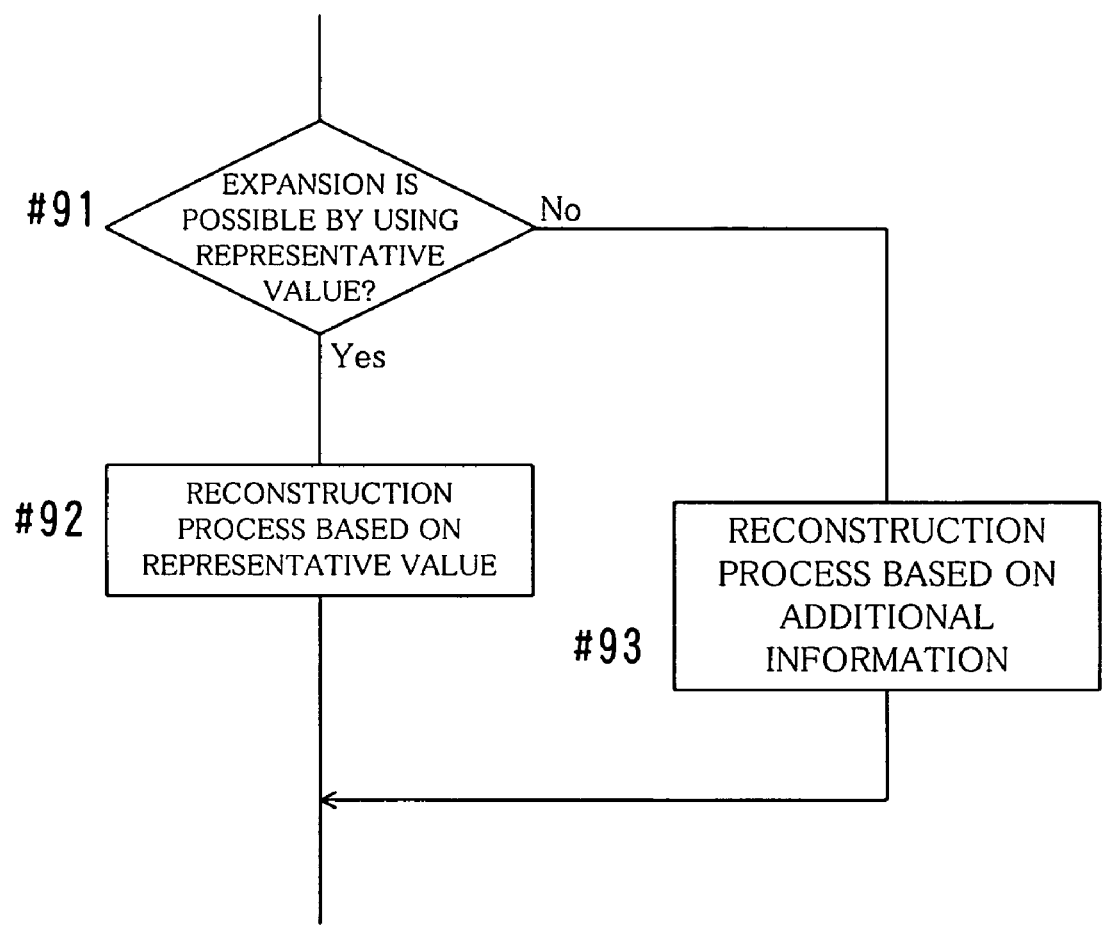
FIG. 28 is a flowchart showing an example of a reconstruction method.
Figure 29:
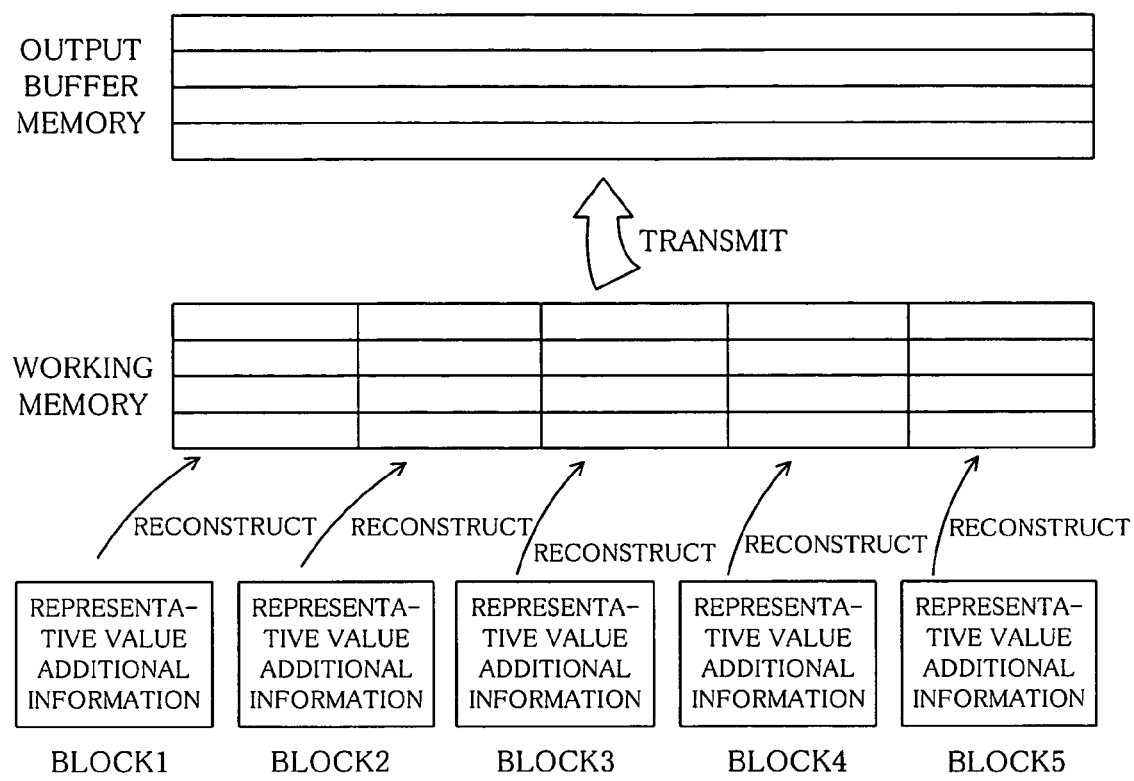
FIG. 29 is a diagram for explaining a conventional expansion process.

FIG. 23 is a flowchart showing an example of an order of outputting the compressed data, FIG. 24 is a flowchart showing another example of the order of outputting the compressed data, FIG. 25 is a flowchart showing an example of a procedure for outputting a representative value, FIG. 26 is a flowchart showing an example of a procedure of the expansion process, FIG. 27 is a flowchart showing another example of the procedure of the expansion process, and FIG. 28 is a flowchart showing an example of a reconstruction method.

In the example shown in FIG. 23, the order of outputting the compressed data after the representative value AP is determined is as below. In each of the bands BD, all the representative values AP of blocks are outputted first, and after that the additional information FJ of each line is outputted.

More specifically, after the representative value AP is determined, all the representative values AP are outputted for one band BD (#41 and #42). After that, the additional information FJ of the first line is outputted from the head sequentially (#43 and #44). When the output for the first line is finished, the additional information FJ of the second line is outputted from the head sequentially, so that all the additional information FJ for one band is outputted (#43-#45). When the output for the one band is finished, the steps #41-#45 are repeated for the next one band BD. The representative values AP and the additional information FJ are outputted similarly. When the output is completed for all the image data FD, the output process is finished (#46).

The calculation of the additional information FJ may be performed just before outputting the same, or it may be performed in advance together.

In the example shown in FIG. 24, the additional information FJ of the first line in the band is outputted together with the representative value AP in each block, and after that the additional information FJ of the second line and the subsequent lines are outputted.

More specifically, when the representative value AP is determined, the representative value AP is outputted (#51). If there is additional information FJ of the first line in the same block TL as the representative value AP, the additional information FJ is outputted (#52). This is repeated, and the representative value AP and the additional information FJ of the first line for one band are outputted (#53).

After that, for the band BD, the additional information FJ of the second line and the subsequent lines are outputted from the head (#54 and #55). When the output is finished for one band (Yes in #56), the steps #51-#56 are repeated for the next one band BD. When the output is completed for all the image data, the process is finished (#57).

In the example shown in FIG. 25, when the representative value is outputted in the steps #41 and #51, the representative value AP is calculated (#61). If the density in the block TL can be expressed by using the calculated representative value AP, i.e., if it is the true representative value, the representative value AP is outputted (#63). If it cannot be expressed, the parameter indicating that there is additional information FJ is outputted as the representative value AP (#64).

In the example shown in FIG. 26, in the expansion process, the received representative values AP for one band are written in the working memory 301 (#71, 72). Reconstruction is performed based on the representative value AP written in the working memory 301, and the result is written in the buffer memory 302 (#73). If there is additional information FJ, the reconstruction is performed based on the additional information FJ for writing in the buffer memory 302 (#74). The steps #73-#74 are repeated until the one band is finished (#75), and the steps #71-#77 are repeated until all the image data are reconstructed.

In the expansion process shown in FIG. 27, the received representative values AP are written in the working memory 301 sequentially (#81), and the reconstruction based on the same and the reconstruction of the first line based on the additional information FJ are performed (#82-#84). Then, the reconstruction based on the representative value AP written in the working memory 301 is performed for writing in the buffer memory 302 (#85). If there is additional information FJ, the reconstruction based on the additional information FJ is performed for writing in the buffer memory 302 (#86). The steps #85-#87 are repeated until the one band is finished (#88), and the steps #81-#87 are repeated until all the image data are reconstructed.

In FIG. 28, if the expansion based on the representative value AP is possible, i.e., if the representative value AP is the true representative value, the reconstruction is performed by using the representative value AP (#92). If it is not the true representative value, the reconstruction is performed by using the additional information FJ (#93).

Other than that, the structure, the function, the number of elements, the number of bits, the process contents, the process order or the like of a whole or a part of the computer main body 11, the printer 13 and the print system 1 may be modified if necessary in accordance with the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for compressing image data having pixels arranged like a matrix in a line direction and a sub scan direction that is orthogonal to the line direction, the method comprising the steps of:
dividing the image data in the line direction and in the sub scan direction into a plurality of blocks covering a plurality of lines;
determining a representative value about density of pixels included in each of the blocks;
determining additional information for each one line in each of the blocks or for each plurality of lines whose number is smaller than the number of lines of the block in each of the blocks, the additional information being information about the density of each of the pixels to be used instead of the representative value or to be added to the representative value, if there is; and
creating compressed data by using the representative value and the additional information wherein each step is performed by a computer.

2. The data compression method according to claim 1, wherein the representative value is an average value of density of pixels in the block, and the additional information is a difference between a density value of a pixel on each of the lines in the block and the average value.

3. The data compression method according to claim 1, wherein the representative value is a parameter for expressing the image data in the block by using a function, and the additional information is a difference between a density value of a pixel on each of the lines in the block and the image data expressed by the function.

4. The data compression method according to claim 1, wherein the image data is obtained by a pseudo gradation process using a dither pattern, and the representative value is selected from a specific density value such that a pseudo gradation image obtained by the pseudo gradation process on the specific density value using the dither pattern that was used for the pseudo gradation process matches the image data in the block.

5. The data compression method according to claim 4, wherein the additional information is the image data on each of the lines.

6. The data compression method according to claim 1, wherein it is decided whether or not the image data are reproduced appropriately based on the representative value, and the additional information is determined as information to be added if it is decided that the image data are not reproduced appropriately.

7. The data compression method according to claim 1, wherein the compressed data are created by using a difference between representative values of neighboring blocks.

8. The data compression method according to claim 1, wherein
the representative value is a palette data indicating a plurality of gradation steps for expressing pixels in the block by reducing the number of gradation steps of the image data, and
the additional information is information indicating which of the gradation steps indicated in the palette data each of the pixels included in a line concerning the additional information in the block corresponds to.

9. The data compression method according to claim 1, wherein
the representative value is a palette data indicating a plurality of colors for expressing pixels in the block by reducing the number of colors of the image data, and
the additional information is information indicating which of the colors indicated in the palette data each of the pixels included in a line concerning the additional information in the block corresponds to.

10. The data compression method according to claim 1, wherein lines in the same number as those in one block are set as a band, and in each band, the representative value in each of the blocks is outputted, and then the additional information of each of the lines is outputted, so that the compressed data are generated.

11. The data compression method according to claim 1, wherein lines in the same number as those in one block are set as a band, and in each band, a representative value of each of the blocks and additional information of a first line in the band are outputted, and then additional information of the second line and subsequent lines are outputted, so that the compressed data are generated.

12. A device for compressing image data having pixels arranged like a matrix in a line direction and a sub scan direction that is orthogonal to the line direction, the device comprising:

a dividing portion for dividing the image data in the line direction and in the sub scan direction into a plurality of blocks covering a plurality of lines;

a determining portion for determining a representative value about density of pixels included in each of the blocks;

a determining portion for determining additional information for each one line in each of the blocks or for each plurality of lines whose number is smaller than the number of lines of the block in each of the blocks, the additional information being information about the density of each of the pixels to be used instead of the representative value or to be added to the representative value; and a creating portion for creating compressed data by using the representative value and the additional information.

13. The data compression device according to claim 12, further comprising an output portion for outputting a representative value in each of the blocks and then outputting additional information of each of the lines, in each band that includes lines in the same number as those in one block.

14. The data compression device according to claim 12, further comprising an output portion for outputting a representative value in each of the blocks together with additional information of a first line in the band and then outputting additional information of a second line and subsequent lines, in each band that includes lines in the same number as those in one block.

15. A method for expanding compressed data that are created from image data having pixels arranged like a matrix in a line direction and in a sub scan direction that is orthogonal to the line direction by using a representative value about density of pixels included in each of blocks obtained by dividing the image data and additional information about density determined for one or more lines in each of the blocks, the method comprising:

a first step for receiving the representative values for blocks for one band consisting of blocks arranged along the line direction;

a second step for receiving the additional information of one or more lines included in the blocks for the one band;

a third step for reconstructing image data of one or more lines concerning the additional information in the one band based on the representative values and the additional information received in the first and the second steps, and for recording the image data in a line memory;

a fourth step for reading the image data recorded in the line memory so as to output the same; and a fifth step for repeating the second through the fourth steps for all the lines included in the one band wherein each step is performed by a computer.

* * * * *